United States Patent
James et al.

(10) Patent No.: US 9,746,932 B2
(45) Date of Patent: *Aug. 29, 2017

(54) GESTURE INFERRED VOCABULARY BINDINGS

(71) Applicant: Microsoft Technology Licensing, LLC, Redmond, WA (US)

(72) Inventors: Alex James, Sammamish, WA (US); Michael Pizzo, Bellevue, WA (US); Pablo Castro, Redmond, WA (US); Michael Justin Flasko, Kirkland, WA (US); Lance Olson, Sammamish, WA (US); Siddharth Jayadevan, Seattle, WA (US); Jason Clark, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,684

(22) Filed: Feb. 24, 2016

(65) Prior Publication Data

US 2016/0170496 A1 Jun. 16, 2016

Related U.S. Application Data

(63) Continuation of application No. 13/329,165, filed on Dec. 16, 2011, now Pat. No. 9,292,094.

(51) Int. Cl.
*G06F 3/033* (2013.01)
*G06F 3/01* (2006.01)
*G06F 3/038* (2013.01)

(52) U.S. Cl.
CPC .............. *G06F 3/017* (2013.01); *G06F 3/038* (2013.01)

(58) Field of Classification Search
CPC ....................................................... G06F 3/017
See application file for complete search history.

(56) References Cited

U.S. PATENT DOCUMENTS

| | | | |
|---|---|---|---|
| 5,734,923 | A | 3/1998 | Sagawa et al. |
| 6,122,647 | A | 9/2000 | Horowitz et al. |
| 6,397,181 | B1 | 5/2002 | Li et al. |
| 7,254,593 | B2 | 8/2007 | Albornoz et al. |

(Continued)

OTHER PUBLICATIONS

"Final Office Action Issued in U.S. Appl. No. 13/329,165", Mailed Date: Jun. 29, 2015, 8 Pages.

(Continued)

*Primary Examiner* — Omar Abdul-Ali
(74) *Attorney, Agent, or Firm* — Davin Chin; Chin IP, PLLC

(57) ABSTRACT

The subject disclosure relates to annotating data based on gestures. Gestures include user interaction with a client device or client software. Gestures are tracked and associated with data. In an aspect, client context associated with a gesture is also tracked. The gestures are then employed to determine a global term to associate with the data. In an aspect, a look-up table comprising a pre-defined relationship between gestures and a global term can be employed. In another aspect, an inference component employ context information in conjunction with the tracked gestures to determine a global term to assign to data. After a global term is determined for data based on a gesture, an annotation file for the data can be created associating the data with the global term.

20 Claims, 10 Drawing Sheets

(56) References Cited

U.S. PATENT DOCUMENTS

| | | |
|---|---|---|
| 7,479,949 B2 | 1/2009 | Jobs et al. |
| 7,607,079 B2 | 10/2009 | Reiner |
| 7,720,953 B2 | 5/2010 | Mateescu et al. |
| 7,788,099 B2 | 8/2010 | Haubold et al. |
| 8,078,958 B2 | 12/2011 | Cottrille et al. |
| 8,289,162 B2 | 10/2012 | Mooring et al. |
| 8,356,036 B2 | 1/2013 | Bechtel et al. |
| 8,495,099 B2 | 7/2013 | Maim |
| 8,504,587 B2 | 8/2013 | Athsani et al. |
| 8,560,297 B2 | 10/2013 | Quirk et al. |
| 8,799,815 B2 | 8/2014 | Hoellwarth |
| 2002/0124018 A1 | 9/2002 | Fifield et al. |
| 2003/0188299 A1 | 10/2003 | Broughton et al. |
| 2004/0249791 A1 | 12/2004 | Waters et al. |
| 2005/0149552 A1 | 7/2005 | Chan et al. |
| 2005/0197784 A1 | 9/2005 | Kincaid et al. |
| 2005/0209989 A1 | 9/2005 | Albornoz et al. |
| 2005/0234958 A1 | 10/2005 | Sipusic et al. |
| 2006/0121795 A1 | 6/2006 | Hashimura et al. |
| 2006/0168480 A1 | 7/2006 | Chandler et al. |
| 2006/0212795 A1 | 9/2006 | Cottrille et al. |
| 2006/0218485 A1 | 9/2006 | Blumenthal |
| 2007/0136657 A1 | 6/2007 | Blumenthal et al. |
| 2008/0036743 A1 | 2/2008 | Westerman et al. |
| 2008/0186255 A1 | 8/2008 | Cohen et al. |
| 2008/0189312 A1 | 8/2008 | Taranov et al. |
| 2008/0256062 A1 | 10/2008 | Dettinger et al. |
| 2009/0018867 A1 | 1/2009 | Reiner |
| 2009/0083314 A1 | 3/2009 | Maim |
| 2009/0119573 A1 | 5/2009 | Wang et al. |
| 2009/0119576 A1 | 5/2009 | Pepper et al. |
| 2009/0132941 A1 | 5/2009 | Pilskalns et al. |
| 2009/0164889 A1 | 6/2009 | Piersol et al. |
| 2009/0307618 A1 | 12/2009 | Lawler et al. |
| 2010/0005061 A1 | 1/2010 | Basco et al. |
| 2010/0005087 A1 | 1/2010 | Basco et al. |
| 2010/0011282 A1 | 1/2010 | Dollard et al. |
| 2010/0057699 A1 | 3/2010 | Sridhar et al. |
| 2010/0070845 A1 | 3/2010 | Facemire et al. |
| 2010/0115393 A1 | 5/2010 | Albornoz et al. |
| 2010/0177956 A1 | 7/2010 | Cooper et al. |
| 2010/0223276 A1 | 9/2010 | Al-Shameri et al. |
| 2010/0325620 A1 | 12/2010 | Rohde et al. |
| 2011/0078205 A1 | 3/2011 | Salkeld et al. |
| 2011/0090407 A1 | 4/2011 | Friedman |
| 2011/0119640 A1 | 5/2011 | Berkes et al. |
| 2011/0169726 A1 | 7/2011 | Holmdahl et al. |
| 2011/0173204 A1 | 7/2011 | Murillo et al. |
| 2011/0173214 A1 | 7/2011 | Karim |
| 2011/0221974 A1 | 9/2011 | Stern et al. |
| 2011/0301941 A1 | 12/2011 | De Vocht |
| 2012/0030553 A1 | 2/2012 | Delpha et al. |
| 2012/0060082 A1 | 3/2012 | Edala et al. |
| 2012/0078906 A1 | 3/2012 | Anand et al. |
| 2012/0166183 A1 | 6/2012 | Suendermann et al. |
| 2012/0246154 A1 | 9/2012 | Duan et al. |
| 2012/0284259 A1 | 11/2012 | Jehuda |
| 2013/0006954 A1 | 1/2013 | Nikoulina et al. |
| 2013/0144878 A1 | 6/2013 | James et al. |
| 2013/0326583 A1 | 12/2013 | Freihold et al. |

OTHER PUBLICATIONS

"Non Final Office Action Issued in U.S. Appl. No. 13/329,165", Mailed Date: Oct. 15, 2013, 8 Pages.

"Non Final Office Action Issued in U.S. Appl. No. 13/329,165", Mailed Date: Apr. 28, 2014, 8 Pages.

"Non Final Office Action Issued in U.S. Appl. No. 13/329,165", Mailed Date: Dec. 4, 2014, 12 Pages.

"Notice of Allowance Issued in U.S. Appl. No. 13/329,165", Mailed Date: Nov. 12, 2015, 5 Pages.

"Website Helps Deaf Learn English with First-Ever Gesture-Based Dictionary"—Published Date: Jun. 13, 2005.

Advisory Action dated Apr. 21, 2014 in U.S. Appl. No. 13/310,517, 2 pages.

Douglas Turnbull et al.; A Game-Based Approach for Collecting Semantic Annotations of Music, International Symposium on Music Information Retrieval (ISMIR '07), Sep. 2007.

Final Office Action dated Feb. 11, 2014 in U.S. Appl. No. 13/310,517, 16 pages.

Final Office Action dated Apr. 17, 2015 in U.S. Appl. No. 13/310,517, 15 pages.

Non-Final Office Action dated Jul. 18, 2013 in U.S. Appl. No. 13/310,517, 11 pages.

Non-Final Office Action dated Jul. 31, 2014 in U.S. Appl. No. 13/310,517, 16 pages.

Notice of Allowance dated Nov. 5, 2015 in U.S. Appl. No. 13/310,517, 10 pages.

Notice of Allowance dated Jul. 30, 2015 in U.S. Appl. No. 13/310,517, 10 pages.

Spiro et al., "Hands by hand: Crowd-Sourced Motion Tracking for Gesture Annotation"—Published Date: Jun. 13-18, 2010, 2010 IEEE Computer Society Conference on Computer Vision and Pattern Recognition Workshops (CVPRW), pp. 17-24.

Subharansu Maj; Large Scale Image Annotations on Amazon Mechanical Turk, UCB Technical Report No. UCB/EECS-2011-79, Jul. 2011.

# GESTURE INFERRED VOCABULARY BINDINGS

CROSS-REFERENCE TO RELATED APPLICATIONS

This application is a continuation of U.S. patent application Ser. No. 13/329,165, filed Dec. 16, 2011, entitled "GESTURE INFERRED VOCABULARY BINDINGS,". The entirety of this afore-mentioned application is incorporated herein by reference.

This application is related to co-pending U.S. patent application Ser. No. 13/310,517 entitled, "DATA DISCOVERY AND DESCRIPTION SERVICE," filed on Dec. 2, 2011, the entirety of which is incorporated herein by reference.

TECHNICAL FIELD

The subject disclosure generally relates to facilitating annotating data based on user interaction with a client device or software associated with a client device.

BACKGROUND

There is a vast amount of data available today and data is now being collected and stored at a rate never seen before. Further, through the employment of various systems such as the Open Data Protocol (OData), data is becoming freed from specific applications and formats. As a result, data is becoming freely accessible and integrated into new uses.

However, although data may be accessible, a new user of the data may not know what the data is, let alone how to use it. For example, data created for a specific application may by structured and described based on the application. As a result, a new user of the data may have to spend time and resources parsing the data in order to determine what it is and how to use it. Further, after examining the data, the user may learn that the data is not what he/she wanted or that the data is not appropriate for his/her intended application. In addition, because data may be structured and described in different ways depending on the source of the data, searching for data can result in under inclusive or over inclusive results.

As a result, when a new user works with data, he or she will spend time and energy interpreting the data, making conclusions about the data, and enhancing the data. Thus each time a user employs data for a particular application, the user imparts meaning on the data. For example, the way in which data is used and displayed indicates user conclusions about the data such as what the data is, how it can be displayed, how it is can be read, and associations relationships between the data and other data. In addition, as more and more data is shared between multiple users, data will likely be interpreted, analyzed, and used in different manners depending on the user and the client applications employed to consume the data. These various interpretations and uses of the data provide a rich indication of the meaning of the data. However, although the actual data may be shared, there does not exist a way to capture and share this acquired meaning. In other words, any user interaction with data cannot be shared for interpretation and application in another context. In existing systems, the user changes the data and shares the actual changed data. Therefore, any modification of data is captured for one context of use with a specific application by the actual application.

The above-described deficiencies of today's techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiment, the disclosed subject matter can relate to an architecture that can facilitate annotating data based on gestures. In accordance therewith, the architecture can include a tracking component configured to track a gesture and associate the gesture with data, wherein the gesture includes user interaction with a client, and an analysis component configured to determine a global term to assign to the data based on the gesture. In an aspect, the architecture can further comprise a data store configured to store a look-up table that associates gestures with global terms, wherein the analysis component is configured to employ the look-up table to determine the global term to assign to the data.

In another embodiment, provided is a method, comprising tracking a gesture, wherein the gesture includes user interaction with a client, associating the gesture with data, and determining a global term to assign to the data based on the gesture. In an aspect, the method can further comprise tracking context information associated with the gesture, wherein the determining the global term to assign to the data based on the gesture further comprises determining the global term to assign to the data based on the context information. In addition, the method can further comprise, generating an annotation file comprising an assignment of the global term to the data.

Further, provided is a computer readable storage medium comprising computer executable instructions that, in response to execution, cause a computing system to perform operations, comprising tracking a gesture, wherein the gesture includes user interaction with a client, associating the gesture with data, and determining a global term to assign to the data based on the gesture. In an aspect, the operations further comprise associating gestures with global terms in a look-up table, and employing the look-up table in the determining the global term to assign to the data based on the gesture.

These and other embodiments are described in more detail below.

BRIEF DESCRIPTION OF THE DRAWINGS

The systems and methods for to facilitating annotating data based on user interaction with a client device or software associated with a client device are further described with reference to the accompanying drawings in which.

DETAILED DESCRIPTION

Introduction to Vocabularies

Figure 1:
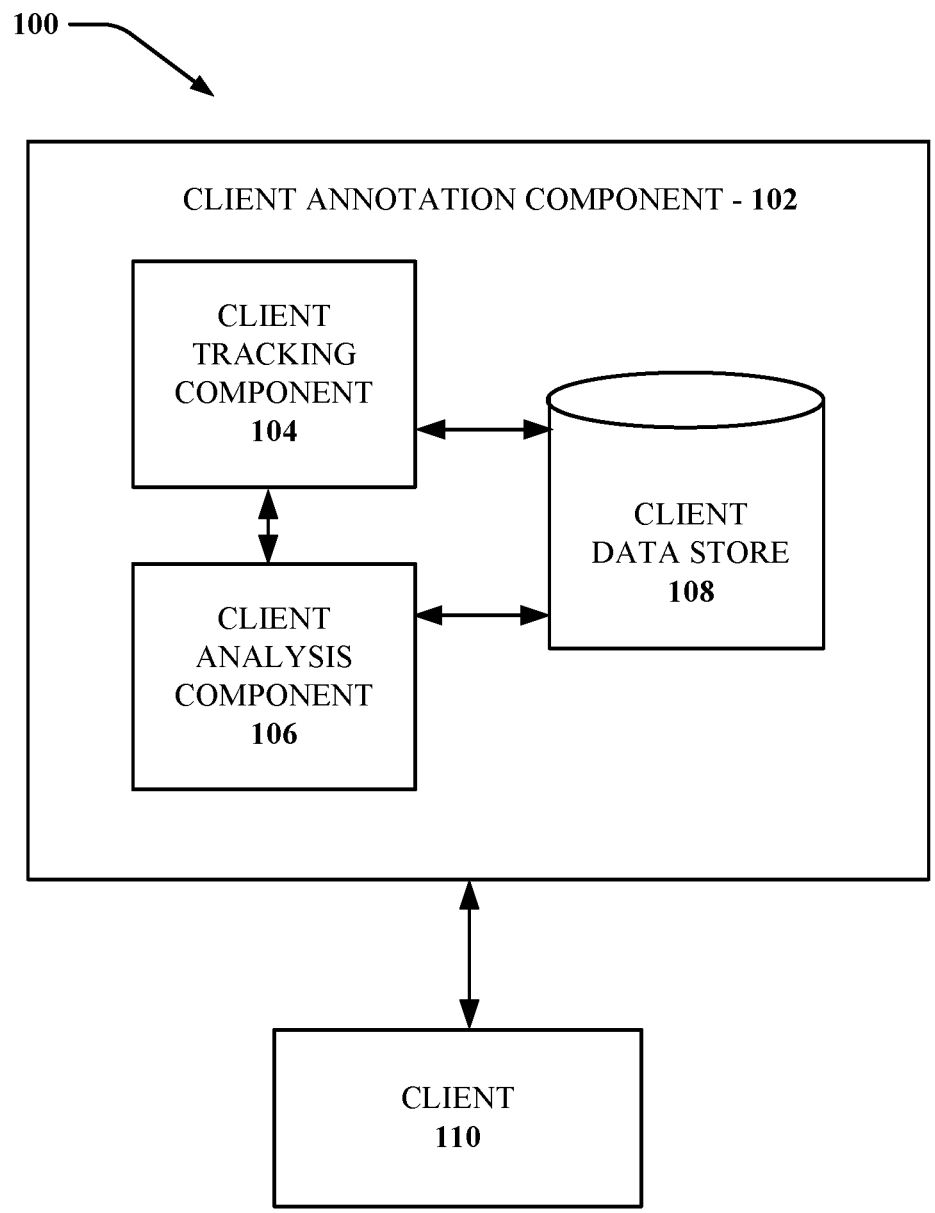
FIG. 1 illustrates a block diagram of an exemplary non-limiting system that can facilitate annotating data based on gestures.

Certain subject matter disclosed herein is directed to the use of vocabularies to facilitate discovery of data and community data enrichment. As used herein, the term data is employed to describe machine-readable data. In a traditional sense, a person's vocabulary is the set of words within a language that are familiar to that person. Each of the words for a particular language have an agreed upon meaning by those individuals whom adopt the language. The words of the language are used merely as the vehicle to express the agreed upon meaning behind them. Therefore, the more words a person acquires in her vocabulary, the better she can clearly express a concept to another individual who understands the meaning of a word employed. A person's vocabulary usually develops with age, and serves as a useful tool for communication and acquiring knowledge The concept of vocabularies can be used as a tool for enabling communication and enrichment of machine-readable data. Our world is awash in data. Vast amounts exist today, and more is created every year. In order to capitalize on the value of data, various methods have been established that allow client applications and associated individuals to freely access data. For example, the Open Data Protocol, commonly called OData enables access to diverse data in a common way. OData is a network protocol for querying and updating data that provides a way to unlock data and free it from silos that may exist in applications. OData does this by applying and building upon existing world wide web (Web) technologies such as hypertext transfer protocol (HTTP), Atom Publishing Protocol (AtomPub) and JavaScript Object Notation (JSON) to provide access to information from a variety of applications, services, and stores. OData can be used to expose and access data from a variety of sources including but not limited to: relational databases, file systems, content management systems and traditional Web sites.

Vocabularies serve as a mechanism to allow producers of data to share more information in a way that can be intelligently understood on the consumption side, resulting in a higher fidelity experience for the consumer. In particular, vocabularies associate meaning with data such that when a client application recognizes a vocabulary associated with data, the client application can automatically understand how to read the data. For example, the consumer application Sesame Data Browser (Sesame) has been configured to render the results of OData queries on a map. Sesame does this by looking for specifically named properties in data embodied in a query result which it guesses represents an entity's location. However, because Sesame guess's which properties represents an entities location, the accuracy of the output is suboptimal. In order to solve the guessing problem, a vocabulary can be employed by the producer of the data to tell the consumer, (i.e Sesame) which property is the entity's location.

Vocabularies are made up of a set of related global terms, which when used, can express some idea or concept. For example, different words can be employed to relay some idea, concept, or meaning associated with data. As used herein, these words are referred to as global terms. In an aspect, global terms can indicate attributes of data. For example, a global term can indicate whether something can be used as a title or a summary. In another aspect, global terms can indicate structure. For example, a global name can indicate the structure of a person's name and contact information. In an aspect, such a vocabulary can be a coined as a "person vocabulary" and have global terms for "first name," "last name," "surname," and so forth. The global terms can potentially describe a structure that can be mapped to some substructure of the data source for an OData feed. The data source might include something called full name. In an aspect, the "person vocabulary" might parse the full name from space to space to map one field or property in the data to the multiple different terms of "first name," "last name," and "surname,"

With regards to the Sesame browser "guessing" problem above, a "location" vocabulary could be employed to determine which property is an entity's location, as well as what coordinate system that location information is in so that a client can properly interpret the data in addition to being aware of its meaning as location data. For example, an OData query result may include actual latitude and longitude. In order for the Sesame browser to identify what properties of the query result are the actual latitude and longitude, a location vocabulary can be established and associated with the query results. Accordingly, regardless of what the actual latitude and longitude field is called in the results, as long as it is associated with global terms for latitude and longitude, the actual latitude and longitude can be identified by a client application who understands "location" vocabulary.

A conceptual schema definition language (CSDL) schema supports annotations, which can be used as an example to refer to a vocabulary and its global terms. In an aspect, if you ask for an OData services metadata document (~/service/$metadata) you get back an entity data model (EDM) represented using the conceptual schema definition language (CSDL) schema. For example, an OData services metadata document could be presented as the following:

```
<EntityType Name="Person" display:Title="Firstname Lastname">
  <Key>
    <PropertyRef Name="ID" />
  </Key>
  <Property Name="ID" Type="Edm.Int32" Nullable="false" />
  <Property Name="Firstname" Type="Edm.String" Nullable="true" />
```

-continued

```
<Property Name="Lastname" Type="Edm.String" Nullable="true" />
<Property Name="Email" Type="Edm.String" Nullable="true">
   <validation:Constraint>
      <validation:Regex>^[A-Z0-9._%+-]+@[A-Z0-9.-]+\.[A-Z]{2,6}$.</validation:Regex>
      <validation:ErrorMessage>Please enter a valid EmailAddress</validation:ErrorMessage>
   </validation:Constraint>
</Property>
<Property Name="Age" Type="Edm.Int32" />
</EntityType>
```

When looking at the above an OData services metadata document, the words EntityType can indicate the vocabulary. Global terms employed as part of the vocabulary can include Constraint and Title for example. Thus for the an EntityType vocabulary, the EntityType definition includes (but is not limited too) both a structural annotation (validation:Constraint) and a simple attribute annotation (display: Title).

The set of global terms for a vocabulary can be related in a variety of ways. For example, the set of related global terms can be related by the consumer application that generally applies the set of global terms, such as Microsoft™Excel or Sesame. In another aspect, vocabularies can include global terms which serve a common purpose such as validation. In another aspect, a vocabulary can be employed to relate capabilities such as this column is writable, readable, nullable or updatable. In yet another aspect, vocabularies can consist of global terms that are grouped together based types. For example, a vocabulary based on type can include but is not limited to an of the following: a creative work vocabulary, and event vocabulary, an intangible vocabulary, an organization vocabulary, a person vocabulary, a place vocabulary, a product vocabulary, a display vocabulary, a relationships/social graph vocabulary, a catalogue vocabulary, and etc.

It should be appreciated that a word or term used to identify a particular vocabulary can be entirely arbitrary. Employing names that already have meaning associated with them per the spoken English language, or other language for that matter, merely capitalizes on a pre-established association between words and the meaning many people already attribute to those words. For example, a vocabulary can be identified by a global term that includes numbers, symbols or made up words, so long as the meaning behind the vocabulary and/or its' global terms is accepted by those who employ the vocabulary and/or global term.

In an aspect, each of the vocabularies described above based on type include at least one global term defining the type of vocabulary itself. For example, each of the terms creative work, event, intangible, organization, person, place, product, and display, relationships, can be considered a global term. In addition, as noted above, a vocabulary includes a set of related global terms. The related global terms of a particular vocabulary can include any conceivable, noun, verb, or adjective employed as a term to describe something that has been or can be related to the particular vocabulary type. For example, an event vocabulary can include global terms such as but not limited to; business event, children's event, comedy event, festival, food event, sports, event, schedule, calendar, speakers, and etc.

In addition, each global term can also include a definition. In an aspect, the definition of a global term can include a literal definition. For example, the definition of the global term speaker could be "a person who serves as a presenter," or the definition of the global term display could be "a manner for presenting an object." In addition, the definition of a global term can further include additional global terms, such as child components associated with the global term. In this respect for example, the global term speaker could include within the definition, a global term for fullname, first name, last name, speech, speech time, and etc. In another aspect, the definition of a global term can include associations to other global terms which could impart the same meaning as the global term itself such as a synonym of the global term. For example, with respect to the global term "speaker," a synonym global term could be "presenter" or "orator." In another example, For example, if global term is "address," its' definition might include child components for street, give synonyms for address such as location or site, or give other global names that are not exactly address but are highly similar.

Regardless of the global terms employed and the definitions provided, as a whole, vocabularies simply establish a system for associating data under common names. As discussed infra, the term annotate as used herein refers to the assignment or association of a global term to data. Once data is associated with a global term, if the consumer recognizes the global term, the consumer will know how to read the data. Global terms are valuable because of their ability to be re-used. Given data, regardless as to whether the data does or does not have metadata associated there, association of a global term with that data can result in a blob of reusable metadata which consumer can bind to without having prior knowledge of the data itself. For example, several data sources could have the same global term applied to it. When a consumer employs those data sources, regardless whether the consumer knows any details of the underlying data, the data consumer can read and display the data in accordance with the global term associated therewith.

Vocabularies group global terms together so that application of a particular vocabulary results a convenient offering of the appropriate tools needed to express the idea or concept embodied in the vocabulary. These tools are the global terms themselves. Vocabularies allow producers of data to teach consumers of the data, richer ways to interpret and handle data. In this respect, vocabularies can range in complexity from simple to complex. A simple vocabulary might consist of a few or even a single global term and tell a consumer which property to use as an entity's title when displaying it in a form. On the other hand, a more complex vocabulary might tell someone how to convert an OData person entity into a visit card (vCard) entry through the application of several global terms. For example, a vocabulary could indicate any of the following: "this property can be used as the Title of this entity;" "this property has a range of acceptable values (e.g. 1 to 100); "this entity can be converted into an vCard;" "this entity is a foaf:Person;" "This navigation property is essentially a 'foaf:Knows [a person]' relationship;" or "this property is a georss:Point."

Once data is associated with a global term, (i.e. once data has been annotated) discovery of the data is facilitated through general knowledge of vocabularies. In addition, any use or improvement of the data can essentially be captured through association of the data with global terms that embody the use or improvement. Data can become annotated in a variety of ways. The remainder of the disclosure relates to facilitating annotating data with gestures.

Overview of Gestrure Inferred Vocabulary Bindings

By way of an introduction, the subject matter disclosed herein relates to various embodiments for annotating data based on gestures. As noted above, an annotation of data includes an assignment of one or more global terms to data. Gesture inferred vocabulary bindings facilitates annotating data in a transparent manner with the user knowing or realizing the data he/she is working with is becoming annotated. In general, a user works with or consumes data on a client device or client software application. In particular, as the user works with data, his/her interaction with the data is tracked by a client annotation component. Interaction with data is captured in the form of gestures. For example, a gesture can be an action or command associated with data, such as clicking on data to select the data, highlighting data, playing media data, or merging data objects.

Tracked gestures are then associated with the data for which they are based. For example, in addition to tracking the gestures, the client tracking component can further track the data associated therewith. In response, the client annotation component can determine a global term to assign to the data is based at least in part on the gesture. In an aspect, the client annotation component can employ a look-up table comprising pre-configured assignments of global terms to gestures. In another aspect, the client annotation component can further track and employ contextual information associated with the data and the client consuming the data at the time of the gesture to infer a global term to assign to the data.

Gesture Inferred Vocabulary Bindings

Referring now to the drawings, with reference initially to FIG. 1, presented is a system 100 configured to facilitate annotating data. Aspects of the systems, apparatuses or processes explained herein can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described In an embodiment, system 100 includes a client annotation component 102 and a client 110. Client annotation component 102 is configured to facilitate annotating data associated with a client 110. As noted supra, annotating data includes associating data with one or more global terms or one or more vocabularies. In general, the term "client" 110 is used herein to refer to a computing device or computer software executable on a computing device configured to process data. For example, a client device could include a personal computer (PC), a tablet PC, a laptop computer, a server computer, a phone, a smartphone, and etc. The term "user" is used herein to refer to an entity or individual who operates a client device or employs computer software.

In an aspect, client 110 is configured to consume, and/or generate data. In another aspect, client 110 is also configured to consume and/or generate annotated data. In an embodiment, client 110 can include software or device that processes any type of data or metadata. Client software can include programs or end-user applications. For example, application software can include software developed to aid in any task that benefits from computation including but not limited to: business software, computer-aided design, databases, decision making software, educational software, image editing, industrial automation, mathematical software, medical software, molecular modeling software, quantum chemistry and solid state physics software, simulation software, spreadsheets, telecommunications, video editing software, video games, and word processing software.

In another embodiment, client 110 is configured to consume data exposed and configured in accordance with OData. For example, client 110 can include any of the following programs or applications: Microsoft™ word, browsers, OData Explorer, Microsoft™Excel, VisualStudio™, Montego™, Microsoft™ Access, LinQPad, Sesame Browser, Client Libraries, OData Helper for WebMatrix, Tableau™, Telerik RadGrid for ASP.NET Ajax, Telerik RadControls for Silverlight™ and WPF, Telerik Reporting, Database NET v3, Pebble Reports, and (Unofficial) SSIS import script. It should be appreciated that the above list of OData clients is merely presented as an example of type of applications which can be employ gesture inferred annotations of data. The subject disclosure however contemplates all applications which consume data regardless as to whether the data is exposed using the OData protocol.

Client annotation component 102 is configured to facilitate annotating data associated with a client 110. In particular, client annotation component 102 is configured to facilitate gesture inferred vocabulary bindings. Client 110 is configured to employ client annotation component 102 in order to annotate data associated with the client 110. In an aspect, as seen in FIG. 1, client annotation component 102 is remote from client 110. According to this aspect, client annotation component 102 can facilitate annotating data associated with a variety of clients. For example, client 110 can include a smartphone that runs a variety of applications. In turn, annotation component 102 can be operable on the client device and employed with any of the variety of applications. In another example, client annotation component 102 can be employed on a computer remote from a client 110 device. In turn, multiple clients 110 can employ annotation component 102 to facilitate annotating data. In addition, although depicted otherwise in FIG. 1, it should be appreciated that client annotation component 102 can be integrated with a client 110. For example, client annotation component 102 can be included with software. According to this aspect, client annotation component 102 is configured to operate in accordance with the software it is associated with. For example, a plurality of software applications can be designed with a client annotation component 102 tailored to each of the respective software applications.

As noted infra, in an aspect, client annotation component 102 is configured to facilitate annotating data based on gestures. A gesture includes any user action, or in some cases inaction, that causes a response in a graphical user interface (GUI) associated with a client. In an aspect, a gesture can include a command or function associated with data. For example, a command could be "select text box X." In this example, the "select" is the command and "text box X" is the related data. In another aspect, a gesture can include input of data. Gestures can be specific to a client or shared amongst a variety of clients. For example, a variety of clients may recognize the gesture "select." However, a specific gesture may include "underline" or "play." The "underline" gesture may for example be specific to a word processing program, while the "play" gesture may be specific to a media client.

Accordingly, gestures can range in complexity depending on the client 110 sophistication. For example, a gesture can include but is not limited to moving a mouse over a data object, clicking a mouse to select a data object, hovering over a data object, typing data, taping on a key, and pressing a combination of keys or buttons. Gestures associated with standard word processing clients can include for example, underline, bold, italic, copy, paste, highlight, drag and drop. Gestures associated with a client device such as a cellular phone can include call, txt, send, attach, convert, delete, and so on.

In an aspect, gestures are facilitated by an input or control device. An input device is any piece of computer hardware equipment used to provide data and control signals to an information processing system such as a computer. An input or control device can include for example, a mouse, a keyboard, a touch screen, a touchpad, a trackball, a remote controller, a game controller, a camera, a sensor, an audio input device, a visual input device, a video input device, or a mechanical motion input device. In addition, an input device can facilitate direct or indirect interaction with a GUI associated with a client.

It should be appreciated that gestures can include any user interaction with a client 110 that is defined by and provided by the client 110. In other words, a client device or software is generally created and preconfigured with the tools that enable full range of use and interaction with the device or software. Use of these "tools" so to speak results in gestures. Accordingly, the client 110 itself is configured to facilitate known gestures.

Turning back to FIG. 1, in an embodiment, in order to facilitate gesture inferred vocabulary bindings, client annotation component 102 comprises a client tracking component 104, a client analysis component 106, and a client data store 108. In an embodiment, client tracking component 104 is configured to track information associated with user interaction with a client 110, including gestures and data objects associated with the gestures. Client data store 108 is configured to store a look-up table that matches gestures with vocabularies and/or global terms. In an aspect, client data store 108 is also configured to store the information tracked by client tracking component 104. Client analysis component 106 is configured to employ the tracked information and the look-up table in order to determine a global term or vocabulary to associate with data based on at least a gesture associated with the data. In response, annotation component 102 is configured to annotate the data with the global term or vocabulary. In an aspect, annotation component 102 is configured to generate an annotation file or document that includes annotations associated with the data. The annotation file can further be stored in client data store 108 and/or sent to an external data store in conjunction with publication of the data.

According to an embodiment, client tracking component 104 is configured to track user interaction with a client 110. In particular, client tracking component 104 is configured to track gestures and data associated with the gestures. In an aspect client tracking component is configured to identify a gesture and track the data associated with the gesture. For example, a gesture could be pressing a call button on a smartphone. The gesture can further be associated with data such as a phone number. In another example, a gesture could be checking a text box that is databound to a field, such as checking a password check box that causes a character entry to become obscured with dots. According to this example, tracking component can track the gesture of checking the text box and associate the character entry with the gesture. In another aspect, a gesture can include selecting rows and columns of a spreadsheet and selecting a pivot table for the selection. In this example, at least two gestures are involved including both selections. According to this example, client tracking component 104 is configured to track the gestures and the data associated the gestures, which is in this case the selected data.

In an aspect, client tracking component 104 is further configured to store tracked information including gestures and the data associated with the respective tracked gestures in temporary memory. In another aspect, client tracking component 104 is configured to store information including tracked gestures and the data associated with the respective tracked gestures in permanent memory. Still in yet another aspect, client tracking component 104 is configured to store information including tracked gestures and the data associated with the respective tracked gestures in client data store.

According to an embodiment, client data store 108 is configured to store information including gestures, vocabularies and global terms, and data types. For example, as noted supra, in an aspect, gestures are predefined by a client 110. Thus in an aspect, client data store 108 comprises a list of all gestures defined by a client. In an aspect, client data store 108 comprises a list of gestures for a plurality of clients. For example, client data store 108 can comprise a file for each client comprising a list of gestures for the respective clients.

In addition, client data store 108 is configured to store gestures series. A gesture series includes two or more gestures which when employed in combination, equate to a global term. For example, as noted above, client tracking component 204 is configured to track gestures. Gesture A alone may equate to global term 1.1, while gesture B alone may equate to global term 1.2 and gesture C may equate to global term 1.3. However, a gesture series ABC comprising global term A followed by global term B followed by global term C, may equate to gesture 12.5.

In an aspect, client data store 108 includes a list of global terms and vocabularies. The global terms and/or vocabularies can also include definitions. According to another embodiment, client data store 108 can include a information regarding data-types. A data-type is an attribute that specifies the type of data that a data object can hold, such as integer data, character data, monetary data, date and time data, binary strings, and so on. For example, in a structured query language (SQL) server, each column, local variable, expression, and parameter has a related data type. An SQL server supplies a set of system data types that define all the types of data that can be used with an SQL Server. In another example, a user can also define his/her own data types, or a data types can be predefined for a client.

Further, according to an embodiment, client data store 108 is configured to store a look-up table that matches gestures or gesture series with at least one of global terms, clients, or data types. Therefore, in an aspect client data store 108 is preconfigured with a list of gestures and gesture series. Further, each of the gestures or gesture series can have at least one predetermined global term or vocabulary associated therewith. In an aspect, client data store 108 is configured to store gestures or gesture series for a single client. For example, the client can be software such as Microsoft™ Excel (Excel™). Accordingly, client data store 108 can store gestures for Excel™ and associate appropriate global terms to those gestures tailored to Excel™. For example, a "drag right" gesture in Excel™ could equate to a global term "column." In yet another aspect, client data store 108 can store gestures for a plurality of clients and differentiate between clients.

Therefore, in an aspect, client data store 108 can also employ a look-up table that associates a gesture or gesture series with a global term based on a client's identity. For example, client data store 108 could store gestures for Excel™ and Microsoft™ Word (Word™). According to this example, same or similar gestures can have different global terms associated therewith based on the client's identity. For example, a "drag right" gesture in Excel™ could equate to a global term "column," while a "drag right" gesture in Word could equate to a global term "predicate." In another aspect, client data store 108 is configured to store gestures that are shared among clients. According to this aspect, client data store 108 is configured to store gestures that apply to multiple client devices or software. Further the global terms associated with the respective gestures can be the same for each client or software application.

In another embodiment, client data store is further configured to store a look-up table that associates a gesture or gesture series with at least one global term based on data type or both client identity and data type. For example, data-types can fall into various categories including exact numerics, approximate numerics, date and time, character strings, Unicode character strings, binary strings, and other types of data. In addition, each category of data types can include specific data types. For example, the exact numerics category can include bigint, bit, decimal, int, money, numeric, smallint, smallmoney, and tinyint. In another example, approximate numerics can include float and real. In yet another example, the character strings category can include char, text, and varchar. According to this embodiment, a gesture can have a different global term associate with it depending on a data-type associated with the data.

As noted supra, client analysis component 106 is configured to employ tracked data and information stored in client data store 108 in order to annotate data. In particular, client analysis component 106 is configured to analyze tracked gestures and the data associated therewith in order to determine an appropriate global term to annotate the data with. In an embodiment, client analysis component 106 employs a look-up table held in the client data store 108. The look-up table can match gestures with global terms, match gestures with global terms based on a client, match gestures with global terms based on a data type, and/or match gestures with global terms based on a data type and a client. According to this aspect, client analysis component 106 examines tracked gestures and the data associated therewith to determine a global term to associate with the data. For example, in the above example where the client is a smartphone, the gesture is pressing "call" and the data is a seven digit number, the client analysis component 106 can employ a look-up table to determine whether the "call" gesture is provided and if so, employ the global term assigned to the "call" gestures, which may be "phone number" for example. Further the if the look-up table contains gesture information for multiple clients, the client analysis component 106 can determine the client for which the "call" gesture and was associated with and further determine the appropriate global term for the "call" gesture based on the client. In addition, if the look-up table includes data-type information, the client analysis component 106 can determine the data associated with a gesture as well as the data-type, and employ the look-up table to find the designated global term for the combination. Further, the look-up table can correlates gestures, global terms, clients, and data-type. With reference to the above example, the client analysis component 106 can determine the data-type for the seven digits is a "numeric." Accordingly, client analysis component 106 can find the appropriated global term that fits the "call" gestures for a "numeric" data-type.

In another aspect, client analysis component 106 is configured to identify gesture series. Client analysis component 106 is configured to parse tracked gestures to identify when a sequence of gestures equates to a defined gesture series. As a result, client analysis component 106 is configured to apply a global term that is associated with the gesture series. For example, client analysis component 106 is can employ a look-up table that associates gesture series with global terms.

Still in yet another embodiment, client analysis component 106 can apply one or more algorithms to determine a global term to annotate data with based on a gestures associated therewith. According to this aspect, client data store 108 can comprises a list of gestures, global terms, clients, and/or data types. In an aspect, each or the gestures/gesture series can be associated with several global terms that could potentially apply to the gesture. Client analysis component 106 is configured to employ tracked data in order to identify a gesture or gestures series and associate the gesture or gesture series with data. In addition, client analysis component 106 is configured to determine a client for which the gesture and data is associated. Further, the client analysis component 106 is configured to determine a data type of the data. Client analysis component is further configured to employ an algorithm to determine the appropriate global term to associate with the data from the potential global terms based on at least one of the client or the data type.

Once client analysis component 106 has determined an appropriate global term to annotate data with, client annotation component 102 is configured to facilitate annotating the data with the global term or vocabulary. In an aspect, client analysis component 106 is configured to automatically annotate data with a global term. According to this aspect, annotations of data can occur seamlessly and unknown to a user. In another aspect, client annotation component 102 is configured to suggest annotations to a user. For example, when working with data with a client, in response to a gesture that is affiliated with a global term, a user can receive a prompt with suggested global terms to annotate the data with. The user can then choose to select a global term to annotate the data.

In an aspect, client annotation component 102 is configured to generate an annotation file or document that includes annotations associated with the data. The annotation file can further be employed in conjunction with the data such that the data can be rendered with the annotations. The annotation file can further be stored in client data store 108 and/or sent to an external data store in conjunction with publication of the data. For example, as discussed infra, a client 110 can publish data to a SharePoint™ site on a network. As a result, the data can become accessible as a data source. In an aspect, the annotation file can be associated with the data where the data is located or stored. In another aspect, the annotation file can be separated from the data. According to this aspect, the annotation file for the data can be stored by and/or accessed by a vocabularies service. In turn, vocabularies service is configured to provide the annotation file with the data when the data is accessed by the client who generated the annotation file for the data or by another client. Vocabularies service 214 is discussed in greater depth infra with reference to FIG. 2 and FIG. 3.

Figure 2:
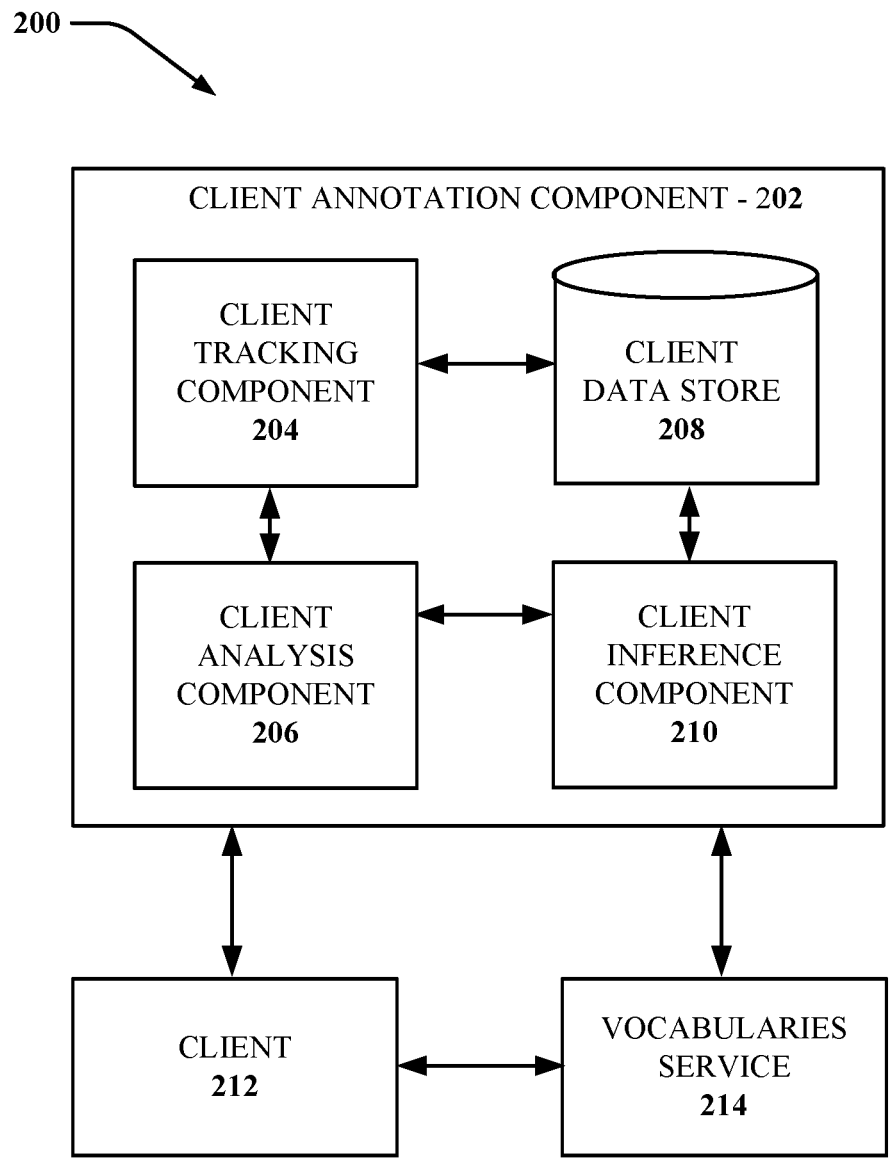
FIG. 2 illustrates a block diagram of another exemplary non-limiting system that can facilitate annotating data based on gestures.

Referring now to FIG. 2, presented is another embodiment of a system 200 configured to facilitate annotating data. Similar to system 100, system 200 includes a client annotation component 202, and a client 212. In addition, system 200 includes vocabularies service 214. Client annotation component includes client tracking component 204, client analysis component 206, client data store 208, and client inference component 210. It should be appreciated that client annotation component 202, along with client tracking component 204, client analysis component 206, and client data store 208, include at least the elements and attributes of client annotation component 102, client tracking component 104, client analysis component 106, and client data store 108. Additional elements and attributes of client annotation component 202, along with client tracking component 204, client analysis component 206, and client data store 208 are discussed below.

Client tracking component 204 is configured to track information including gestures and associated data. In addition, client tracking component 202 is configured to track context information. In an aspect, information tracked by client tracking component 202 is stored in client data store 208. Context information includes the conditions, facts, and circumstances that surround a gesture. Accordingly, context information can include a variety of different information. In an aspect, client tracking component 204 is configured to track all context information surrounding a gestures. In another aspect, client tracking component 204 is configured to track context information that is relevant to inferring a global term to be applied to data associated with a gesture.

In an aspect, context information includes any metadata associated with data employed by a client for which a gesture is associated. The metadata can include structural metadata and descriptive metadata. Structural metadata includes the design and specification of data structures. Descriptive metadata on the other hand, includes individual instances of application data, including data content. In an aspect, metadata includes data providing information about one or more aspects of the data, including but not limited to: means of creation of the data, purpose of the data, time and date of creation, creator or author of the data, placement on a computer network where the data was created, or standards used to create the data. For example, a webpage may include metadata specifying what language its' written in, what tools were used to create it, and where to go for more information on the subject, allowing browsers to automatically improve the experience of users. In another example, a digital image may include metadata that describes how large the picture is, the color depth, the image resolution, when the image was created, and other data. A text document's metadata may contain information about how long the document is, who the author is, when the document was written, and a short summary of the document.

According to an embodiment, context information can include metadata in the form of annotations on data. In an aspect, the global term assignments of an annotation files are metadata. In an aspect, in addition to global terms, an annotation file can further include definitions of the global terms. As discussed infra, definitions of global terms can describe the meaning of a global term, global terms related to the global term, and parameters for consumption of the global term. According to this embodiment, a client 212 can consume data that has been previously annotated. The client 212 can further access and associate annotations files with the annotated data being consumed. Therefore, client tracking component 204 is configured to track annotations of data as context information.

In addition, context data can include client 110 responses to gestures. In general, gestures cause responses. For example, a response can include but is not limited to an initiation and completion of a process associated with data, a modification of data, a recording of a fact about data, a transformation of data, or a communication of data. In an example, when working with a spreadsheet, a user can employ a gestures series such as "select rows and columns" and select "create map." A response to the "create map" gestures could include displaying a map and further initiating a global positioning system to indicated where the user is physically located in relation to the map. In another example, a gesture can include pressing "call" against a seven digit number. A response to the gesture could include a completion of a phone call lasting a particular duration, or message indicating the phone number is invalid.

Another example of a response to a gesture or gesture series includes the merging of data in response to a mail merge gesture. A mail merge is a method of taking data from a database, spreadsheet, or other form of structured data, and inserting it into documents such as letters, mailing labels, and name tags. In an aspect, a mail merge requires at least two files, one storing the variable data to be inserted, and the other containing both the instructions for formatting the variable data and the information that will be identical across each result of the mail merge. For example, in a form letter, a user might include instructions to insert the name of each recipient in a certain place. A gesture selecting "mail merge" would result in combining the letter with a list of recipients to produce one letter for each person in the list.

According to an embodiment, context data can further include a user associated with a client and data. For example, in an aspect, client annotation component 202 can facilitate annotating data for multiple clients. According to this aspect, annotation component can facilitate annotating data for multiple client devices or multiple software applications. It should be appreciated that multiple users can work with data on a client device or software application. Where multiple users are associated with the multiple clients, client tracking component 212 can track gestures for each of the respective users of a client and the data that is consumed by the client. In particular, multiple users may work with the same data. Client tracking component 204 can thus be configured to track the users performing gestures on data for a client 212. Client tracking component 204 can further determine responses to gestures for each of the respective users of clients. It can be appreciated that multiple users will perform the same gestures on the same data, thus generating same responses. It can be appreciated that multiple users will perform different gestures on the same data, thus generating different responses.

Context data can further include physical parameters associated with client interaction. In an aspect, physical parameters can include hardware constraints and requirements imparted by a client device. For example, a client device could in include a smartphone with specific display requirements or a smartboard with entirely different display requirements. In another aspect, physical parameters can include a device location and the surrounding physical elements. For example, in an aspect, tracking component 204 is configured to determine the location of a client device and the physical landscape of the location of the client device including structures, people, and other devices. In another aspect, tracking component 204 is configured to determine usage activity associated with the other devices.

As noted above, client data store 208 can store information tracked by tracking component 204, including gestures, data associated with the gestures, and context information. Client data store 208 also stores a compilation of gestures/gesture series and global terms. In an aspect, client data store 208 can store definitions of the global terms. In addition, client data store can store look up tables that assign global terms to gestures/gesture series. In an aspect, the look-up tables can also assign global terms to gestures/gesture series based on a client and/or a data-type.

Client analysis component 206 is configured to determine a global term to assign to data based on a gestures or gesture secrecies associated with the data. As with client analysis component 106, client analysis component 206 can employ tracked information and a look-up table held in data store 208 in order to determine a global term to assign to data. In another aspect, client analysis component 206 can employ one or more algorithms to match a global term with data associated with a gesture based on a client and/or a data type.

Referring back to FIG. 2, client annotation component 202 can further comprise a client inference component 210. Client inference component 210 is configured to infer a global term to annotate data with based on a gesture/gesture series associated with the data. In particular, client inference component 210 is configured to infer a gesture to annotate data with based on tracked gestures, tracked data associated with the gestures, and context information.

Client inference component 210 employs explicitly and/or implicitly trained classifiers in connection with performing inference and/or probabilistic determinations and/or statistical-based determinations as in accordance with one or more aspects of the disclosed subject matter as described herein. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. In particular, captured data includes context data. In another aspect, as discussed infra, client inference component 210 can employ vocabularies service 214 to assist in inferring annotations for data based on gestures.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems can be employed in connection with performing automatic and/or inferred action in connection with the disclosed subject matter.

In an aspect, similar to client analysis component 206, client inference component 210 can employ pre-configured associations between gestures and global terms as well as gestures and global terms based on client and/or data type stored in data store 208. According to an aspect, a gesture or gesture series can be associated with multiple global terms in data store 208. Client inference component 206 can further employ context information to select an appropriate global term from to annotate data with based on context. In another aspect, client inference component is further configured to employ context data to infer annotations based on gestures. According to an embodiment, inference component 206 can infer associations between global terms and gestures.

In an embodiment, client inference component 210 identifies a gesture/gesture series from tracked information and associates the gesture/gesture series with data. The client inference component 210 then intelligently determines a global term to annotate the data with based on an inferred or pre-configured relationship between the gesture/gestures series and a client, a data type, and context information. As noted above, context information includes the conditions, facts, and circumstances that surround a gesture. Context information includes but is not limited to metadata associated with data underlying a gesture, metadata in the form of annotations associated with data underlying a gesture, client responses to gestures, and physical parameters associated with client interaction.

By factoring in context information, client inference component 210 can accurately determine an appropriate global term to annotate data with. In particular, context information supplies client inference component 210 with facts about data and a gesture/gesture series associated with the data that can employed by client inference component 210 to accurately infer meaning about the data. The meaning about the data is further embodied in one or more global terms which are determined by the client inference component 210. For example, a user can employ a client device such as a smartphone and receive a search query comprising data including a seven digit number. The user can further select the number and perform a call gesture such a pressing a "call" button. The user could then perform a phone call for five minutes. According to this example, client inference component can examine the gesture, which is pressing "call," on a data object, the seven digit number, along with context information, the fact that a call lasting five minutes was performed, in order to clearly infer that the seven digit number is a phone number. In particular, the client inference component 210 can determine the global term "phone number" as the appropriate term to annotate the seven digit number with.

As noted supra, in an aspect, client tracking component 204 can track gesture responses for multiple clients. Because client tracking component 204 can collect context data for multiple clients and/or user's associated with clients, client inference component can further infer global terms based on statistical information. In furtherance to the above example, multiple other users of client devices could also employ data comprising the same seven digit number. Each of the other user's of client devices could perform gestures on the seven digit number which generate responses that cause client inference component 210 to associate the global term "phone number" with the seven digit number. For example, other users could perform the "call" gesture against the seven digit number or other users could perform a "text" gesture against the seven digit number. For example, client inference component can determine that 90% of the time, collective gestures and context information associated with the seven digit number indicate that the seven digit number is a phone number. Client inference component 210 can therefore infer that the seven digit number should be annotated with the global term "phone number."

In an embodiment where context data is metadata in the form of an annotation on data, client inference component 210 can employ the annotation when inferring global terms based on a gesture/gesture series. In particular, client inference component 210 can employ relationships between a global term in the annotation with other global terms to determine an appropriate global term to apply to data associated with a gesture. In another aspect, client inference component 210 can employ relationships between global terms in the annotation and data sources to facilitate determining appropriate an appropriate global term to apply to data associated with a gesture.

In an embodiment, in order to facilitate inferences based on gestures and annotations on data, data store 208 can hold definitions of global terms. In an aspect, a definition of global term can include a descriptive meaning of the global term. In an aspect, the definition can serve to identify the data. In another aspect, the definition can indicate how the global term is to be applied to data and the resulting output of the data when associated with the global term. Definitions can further include associations between vocabularies and global terms. For example, a vocabulary can employ a distinct nomenclature comprising of particular set of global terms. The definition of a vocabulary can include all of the global terms of that vocabulary and the also the definitions of those global terms themselves. Furthermore, the definition of a global term can include rich information regarding associations between the global term and other global terms. For example, a definition of a global term can include child components of the global term, synonyms of the global term, and related global terms. In another aspect, as described infra, the definition of a global term can include parameters of use in the form of filters.

Client inference component 210 can employ definitions of global terms that have already been applied to data employed on a client to infer additional global terms to annotate the data with. In particular, client inference component 210 infer additional global terms based on relationships between global terms as embodied in their definitions. By way of example, suppose a client employs a data source that has a single global term applied to it, such as "person." Then suppose the a user of the client preformed a gesture on the data which indicated such as inputting a date field. According to this example, the client inference component can infer that the date field might fall under the global term "birth date" given an association between the global term "person" and "birth date" in the definition of the global term "person." It should be appreciated that the richer the annotation, in other words, the greater the number of global terms applied to data, the more accurate the client inference component 210 will be at inferring related global terms.

In an aspect, client inference component 210 can determine multiple global terms that could be applied to data. In turn, client annotation component can provide a user with global term suggestions and allow the user to choose a global term to apply from the multiple global terms. In another aspect, client inference component 210 can determine a single global terms or set of global terms to apply to data which can then be employed by client annotation component 202 to automatically annotate the data.

Referring back to FIG. 2, in another embodiment, in order to facilitate annotating data, client inference component 210 can employ vocabularies service 214. In particular, client inference component 210 can employ vocabularies service 214 to facilitated determining global terms to apply to a data source based on proposed global terms, existing annotations, or key terms inferred from the data. For example, client inference component can infer a possible global term to associate with data based on a gesture and context, where context does not include annotations. In addition, client inference component 210 can use the possible global term as a search term with vocabularies service 214 to determine additional global terms which could apply to the data. In another example, client inference component 210 can utilize existing annotations on data to request suggested global terms from vocabularies service 214 based on the annotations. In yet another aspect, client inference component 210 can utilize inferred key terms from data to search for global terms to apply to the data via vocabularies service 214. Aspects and advantages afforded by vocabularies service 214 with regard to facilitating annotating data based on gestures is described below with reference to FIG. 3.

Figure 3:
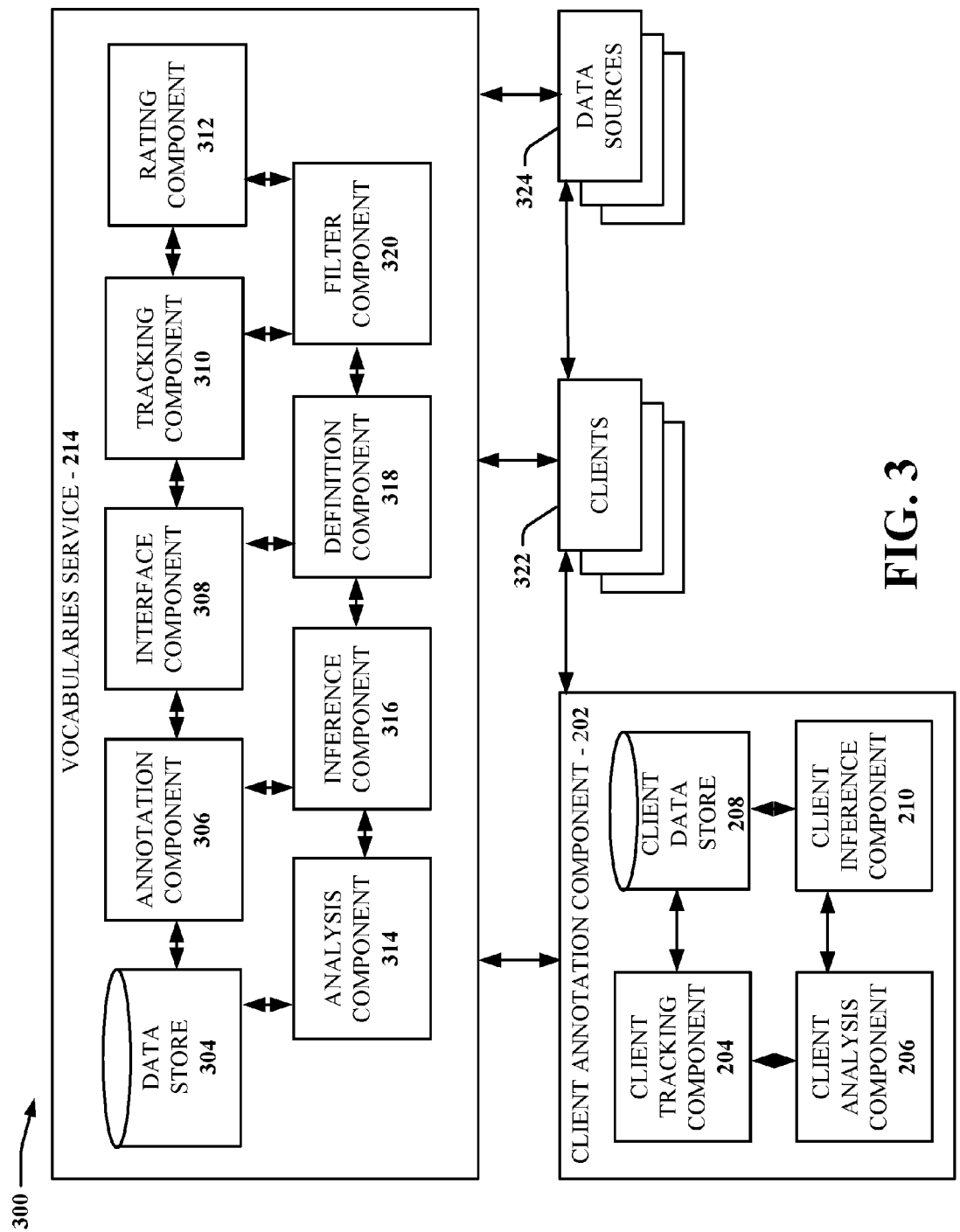
FIG. 3 illustrates block diagram of an exemplary non-limiting system that can facilitate annotating data based on gestures according to a third embodiment.

Turning now to FIG. 3, presented is an embodiment of a system 300 configured to facilitate annotating data. System 300 includes client annotation component 202 discussed supra, one or more clients 322, one or more data sources 324, and vocabularies service 214. Clients 322 can include the features and attributes of clients 110 and 212 previously discussed. Vocabularies service 214 comprises data store 304, annotation component 306, and interface component 308, tracking component 310, rating component 312, analysis component 314, inference component 316, definition component 318, and filter component 320.

Vocabularies service 214 is configured to receive annotations of data for data sources 324 and apply those annotations when interfacing a client 322 to the data sources that have been annotated, regardless of where the annotations came from. Therefore, any client 322 can receive richly configured data from data sources 324 that have been previously annotated. Accordingly, the entire community benefits from the collective annotations. In addition, vocabularies service 214 provides a centrally located data store 304 which stores these annotations. The data store 304 further stores a list of data sources or descriptions of data sources 324, and a list of global terms including definitions of the global terms. Vocabularies service 214 further provides an application program interface (API) in the form of an interface component 308 to enable discovery of data based on annotations and provide clients 322 access to annotated data from various data sources.

In order to facilitate discovery, via the interface component 308, vocabularies service 214 is configured to issue query results against the data store 208. According to an embodiment, client annotation component 202 employs vocabularies service 214 to find global terms to annotate data with. In particular, client inference component can employ context data to search for global terms associated with gestures.

In an embodiment, data store 304 is configured to store information regarding locations of data, (i.e. data sources 324), and any additional information describing the data by way of vocabularies that have been applied to the data. Further, data store 304 is configured to store rich information about global terms and vocabularies through definitions of the global terms and associated vocabularies. In an aspect, the information stored by data store 304 is centrally available. For example, data store 304 can be provided on a server computer that can be accessed via a network. The network can be public or private. Annotation component 306 is configured to receive an annotation of data for a data source 324. Interface component 308 is configured to provide clients 324 access to the data store 304. In an aspect, interface component 308 enables a client 322 to query the data store 304 based on the information held therein.

Data store 304 is configured to hold at least three categories of information. The first category includes the location of data. There are many possible sources of data. Applications collect and maintain information in databases, organizations store data in the cloud, and many firms make a business out of selling data. In an aspect, data is located at an entity or service that produces the data. In another aspect, data is located at an entity or service that publishes the data. According to this aspect, a client 322 who consumes data sources 324 can also provide data as well and thus service as a data source 324. As used herein the location of data includes the data source 324. Data sources are accessible by a computing network such as the world wide web, the internet, or intranet. In general, data sources are identified by a uniform resource identifier (URI) that includes a specific URL and uniform resource name (URN). Data sources 114 are discussed in greater depth supra.

The second category of information includes held in data store 304 includes definitions of vocabularies and the global terms included in those vocabularies. As noted supra, the definition of a global term encompasses a description of the meaning of the global term. In an aspect, the definition can serve to identify the data. In another aspect, the definition can indicate how the global term is to be applied to data and the resulting output of the data when associated with the global term. Definitions can further include associations between vocabularies and global terms. For example, a vocabulary can employ a distinct nomenclature comprising of particular set of global terms. The definition of a vocabulary can include all of the global terms of that vocabulary and the also the definitions of those global terms themselves. Furthermore, the definition of a global term can include rich information regarding associations between the global term and other global terms and data sources. For example, a definition of a global term can include child components of the global term, synonyms of the global term, and related global terms. In another aspect, as described infra, the definition of a global term can include parameters of use in the form of filters.

The third category of information includes annotations. As noted supra, an annotation includes the assignment of a global term to data of a data source. In an aspect, annotations can be thought of as the mapping of vocabularies and global terms to data sources. When a vocabulary is applied to a data source, one or more global terms of that vocabulary is assigned to data of the data source. The assignment of a global term to data indicates how a global term is used for a data source. In an aspect, when a data source 324 is annotated, a file or document is generated that includes metadata outlining how a global term is applied to the data. In addition, the metadata can include additional rich information including definitions of global terms and associations between other global terms.

By providing annotations in data store 304, those annotations can be made centrally available through the vocabularies service 214. Accordingly, whenever another client 322 works with a particular data source, the client 322 can choose to employ any previous annotations of the data. For example, data from data source X could be marked or annotated with the global term "company name." In an aspect, when a client works with data from data source X, the concept or idea imparted by the global term "company name" on the data can be offered to the client. For example, the data assigned to the global term "company name" could be presented in an underlined fashion. In another aspect, data from data sources Y and Z could be annotated with the global term "company name." Regardless of the meaning the global term "company name" imparts on a client application which interprets the global term "company name," it is possible that advantages may lie in combining sources X, Y and Z based on the global term "company name." Thus because data sources X, Y, and Z have been annotated with the global term "company name," a client can discover the relationship between the three sources.

Annotation component 306 is configured to receive as input, annotations of data for a data source 324. In an aspect, annotation component 306 receives annotations of data for a data source in the form of a file document in response to data being annotated. In another aspect, annotation component 306 generates an annotation file for a data source in response to data being annotated by a user or client application. The annotations or annotation files can then be stored in data store 304. The annotation file can include any metadata associated with the data including the assignment of vocabularies and global terms to data of a data source in the form of metadata.

In an aspect, annotation component 306 receives an annotation for a data source when the annotated data is published by the data source. For example, data sources 114 can include a centralized space for sharing documents over a public or private network. In an aspect, a data source can include SharePoint™ site. SharePoint™ is a content management system developed by Microsoft™ Corporation. SharePoint™ allows groups to set up a centralized, password protected space for document sharing. Documents can be stored, downloaded and edited, then uploaded for continued sharing. Accordingly, in an aspect, clients 322 can annotate data locally and store the annotated data in a local database, such as client data store 208. The client 322 can further choose to publish the data to a public sharing site such as a SharePoint™ site. When the data is published, an annotation file associated with the data is also published and linked to the data source by the annotation component 306. In another aspect, annotation component 306 can extract annotation files associated with data sources.

Interface component 308 is configured to enable discovery of annotated data, data sources and global terms. In an embodiment, interface component 308 is configured to find global terms that can be employed to annotate data. For example, interface component 308 can receive a global term and find related global terms. According to this example, client inference component 210 can provide interface component 308 with global terms. In particular, client inference component 210 can infer possible global terms based on gestures and provide interface component 308 with the possible global terms to find additional global terms. In another aspect, client inference component can employ existing annotation of data to find additional or related global terms. In another example, interface component 308 can receive search terms or phrases from client inference component 308 and parse the definitions of global terms to return possible global terms that correspond to the search terms or phrases. The possible global terms can then be employed by the client 322 to annotate data.

Data sources 324, can include any possible source of data that can be accessed via a network. There are many possible sources of data. For example, applications collect and maintain information in databases, organizations store data in the cloud, individual produce personal data and store it locally, and many firms make a business out of selling data. In an aspect, a data source can include numerous amounts of different types of data at a specific location. The specific location is generally identified by a URL. In an aspect, a data source includes a service configured to expose data using the OData protocol. It should be appreciated that any service, individual, program, website, and etc. can be configured to expose data using the OData protocol. Some examples applications that expose OData data sources include but are not limited to: SAP NetWeaver, GatewaySharePoint 2010, IBM Web Sphere, Microsoft™ SQL Azure, Microsoft Dynamics™ CRM 2011, GeoREST, Webnodes CMS, Telerik OpenAccess ORM, and tm2o—OData provider for Topic. Some examples of live OData data sources include, Facebook Insights, ebay, Netflix™, twitpic, Wine.com, Nuget, Nerd Dinner, Windows Live, and Microsoft™ Pinpoint.

Referring back to FIG. 3, in an embodiment, tracking component 310 is configured to track annotations of data sources and client interaction with vocabularies service 214. Any information monitored or tracked by tracking component 310 can be collected and stored in data store 304. With respect to annotations of data sources, in an aspect, tracking component 310 is configured to monitor the number of times a data source is annotated and the manner in which data is annotated. In another aspect, tracking component 310 is configured to track what global terms are applied to data of a data source, how often they are applied, when they are applied and who or what entity applies them. In another aspect, tracking component 310 is configured to track usage requirements and parameters associated with data annotations. For example, tracking component 310 is configured to determine languages of annotations and client requirements associated with employing the annotations.

With respect to client 322 interaction with vocabularies service 214, in an embodiment, tracking component 310 is configured to track client or user patterns with respect to consumption of data from data sources based on annotations and the definitions provided for the global terms of those annotations. In particular, in an aspect, interface component 308 is configured to issue search queries against the contents of data store 304 based on any of the three types of data stored in data store 304. For example, interface component 308 could receive a request for all the data sources which have the global term "movie" applied. In another example, interface component 308 could receive a request for all of the global terms that have been applied to a particular data source. In another example, interface component 308 could receive a request for global terms which are related to or commonly applied in an associated relationship with a specific global term. Relationships between global terms including synonyms and related terms are provided in the second category of data in data store 304, definitions of global terms. Accordingly, interface component 308 can parse a definition of a global term to determine additional information about the global term.

Therefore, according to an aspect, tracking component 310 is configured to track selection and use of data sources based on like terms or related terms. For example, a user or client may discover two or more data sources employing a common term or a related term and choose to join the two or more data sources at consumption. According to this example, tracking component 310 is configured to monitor when data sources are commonly employed together by a client.

It should be appreciated that the above examples of information that tracking component 310 is configured to collect are merely indented to present examples of some of the types of information tracking component 310 may collect. It should be appreciated however that tracking component 310 is configured to track any type of user or client interaction with a data source based at least in part on the association of data of that data source with one or more global terms. The information tracked by tracking component 310 can further be stored in data store 304 for future access and analysis.

Rating component 312, is configured to enable users of the vocabularies service 214 to rate annotations of data sources based on annotations. In another aspect, rating component 312 is configured to enable users to rate individual global terms and vocabularies. Still in yet another aspect, rating component 312 is configured to enable users to rate data sources based on the overall quality of the data and annotations associated therewith. The ratings received by rating component 312 can further be stored in data store 304 for future access and analysis.

Analysis component 314 is configured to analyze data in data storage 304 in order to make conclusions about data, data sources, definitions of global terms and annotations based on the information held in data storage 304 which. These conclusions can be employed by the vocabularies service to enhance the objectives of the service. In an aspect, these conclusions can be employed by client inference component 210 to facilitate annotating data. As noted supra, tracking component 310 is configured to track any type of user interaction with a data source based at least in part on the association of data of that data source with one or more global terms. The information tracked by tracking component 310 can further be stored in data store 304 for access and analysis by analysis component 314.

According to an embodiment, analysis component 314 is configured to employ tracked data and annotations to determine the following: the degree of popularity of a data model, the quality of a data model, the popularity of a global term, the array of global terms applied to a data source, the reputation of a data model, the clientele distribution of consumption of a data model, the reputation of a data source, the frequency and timing of consumption of a data model, or the location of consumption of a data model. A data model is the manner in which data is conveyed as a result of the manner in which it is annotated. For example, the degree of popularity of a data model can be determined by one or more algorithms that account for the number of times a data model is consumed. In another aspect, the quality of a data model can account for the number of times the data model is consumed, the rating of the data model, and the clientele distribution of consumption of the data model. Further, analysis component 314 can employ statistical analysis to associate percentages with conclusions. For example, analysis component 314 can determine the percentages associated with global term or vocabulary usage against a data source as compared to other global term or other vocabulary usage. In an aspect, analysis component 314 can make the above determinations on a routine basis and store the determinations in data store 304. In another aspect, analysis component 14 is configured to perform the above determinations in response to query requests. For example, client inference component 210 is configured to request any of the above noted information from vocabularies service 214.

In another embodiment, analysis component 314 is configured to employ tracked data to identify information that can be employed in the definitions of global terms. As a result, analysis component 314 can generate definitions of global terms. The definitions can further include profiles of the global terms including any conclusions about the use, meaning, or associations of the global term. For example, analysis component 314 can examine annotations to analyze trends in the application of global terms against certain types of data. Similarly, analysis component 314 can identify when data sources are merged based on different user selected global terms to identify a relationship between the terms. Analysis component 314 can further make conclusions about the data sources based on the merge. For example, a client application can choose to merge data source A with data source B based on a common annotation scheme or a related global term. In addition, any rich information known regarding data source A can now be associated with data source B. For example, suppose data source A had people data. Analysis component 314 can further note that data source B relates to people data as well.

In addition, analysis component 314 is configured to analyze annotations to identify patterns for usage of global terms and structure of the underlying data. For example, analysis component 314 is configured learn associations between global terms and the underlying data structure. In another aspect, analysis component 314 is configured to examine which global terms which are employed together and how they are employed together to determine relationships between the global terms. For example, analysis component 314 can examine annotated data to extract relationships between global terms. Further, analysis component 314 can employ statistical analysis to associate percentages with conclusions regarding global term relationships. For example, analysis component 314 can learn that in 80% of the time the "zipcode" annotation is followed by a "map" annotation.

Further, analysis component 314 can employ tracked user interaction with the vocabularies service 214 to discern associations between global term and data sources. Accordingly, analysis component 314 can employ tracked user patterns and annotations to identify related global terms, similar global terms, and synonymous global terms. Related global terms can include any global terms which have a similar meaning, similar applications, harmonious application or other relationship. Synonymous global terms can include terms which mean the same thing and convey the same concept or idea. It should be appreciated that global terms in different languages may be synonymous.

Furthermore, as discussed below, the definitions of global terms can include requirements for consumption of data annotated with the global term. For example, client applications or device may not support the data model exhibited by an annotation with a particular global term. According to this aspect, analysis component 314 can use tracked information indicating what client application or device generated an annotation to identify appropriate restrictions for future consumption of the annotate data. In another aspect, certain data models might be inappropriate in for use in certain contexts or environments. According to this aspect, analysis component 314 can use tracked data indicating location and/or context of consumption of a data model to determine restrictions for applications of data models and or global terms. Interface component 308 can further employ the conclusions regarding restrictions for consumption when issuing query results to a client. For example, interface component 308 can provide client inference component with suggested global terms which satisfy the consumption requirements of a client.

In yet another embodiment, analysis component 314 is configured to employ conclusions regarding associations between global terms to facilitate annotating data. According to this aspect, analysis component 314 can facilitate suggested annotations of data sources and/or automatic annotations of data sources by providing client inference component 210 with global terms for a data source based on related annotations. For example, it is possible that a data source is not annotated or minimally annotated. Analysis component 314 is configured to interpret the structure of the un-annotated data and based on observed annotations of similarly structured data, analysis component 314 is configured to determine global terms to apply to the un-annotated data. For example, analysis component 314 can generate suggested annotation of data sources or automatically annotate the data. In another aspect, a client can annotate data with a first global term. Once the data has a first global term applied, the vocabularies service 214 via the analysis component 314 can profile the data term to determine additional possible global terms or vocabularies that may fit the data. In particular, client inference component 210 can employ suggested global terms based on profiling against existing annotations of data to enhance it's determinations of an appropriate global term for the data based on a gesture.

Inference component 316 is configured to assist analysis component 314 in making conclusions regarding data, data sources, definitions of global terms and annotations based on the information held in data store 304. In an aspect, inference component 316 is configured to employ data in data store 304 to determine the following: the degree of popularity of a data model, the quality of a data model, the popularity of a global term, the array of global terms applied to a data source, the reputation of a data model, the clientele distribution of consumption of a data model, the reputation of a data source, the frequency and timing of consumption of a data model, or the location of consumption of a data model. Inference component 316 can further assist analysis component 314 when determining possible annotations for data sources. For example, inference component can account for a variety of factors such as the type of client, the type of data, the location of the client, the requirements of the client device, and/or recent popular global terms in order to provide appropriate annotations to client inference component 210 for data sources.

Like client inference component 210, inference component 316 can employ explicitly and/or implicitly trained classifiers in connection with performing inference and/or probabilistic determinations and/or statistical-based determinations as in accordance with one or more aspects of the disclosed subject matter as described herein. For example, the inference component 316 can employ previous annotations of data sources and compare them with annotations of other data sources to automatically determine new annotations of data sources. In another aspect, inference component 316 can infer likely joinings of data sources based on patterns recognized in previous joinings. As a result, vocabularies service 214 can suggest possible combinations of data sources, or infer annotations based on the patterns.

Definition component 318 is configured to employ conclusions and determinations made by analysis component 314 to generate definitions for global terms. As discussed supra, a definition of global term can include a descriptive meaning of the global term and can serve to identify the data. A definition can also indicate how the global term is to be applied to data and the resulting output of the data when associated with the global term. Definitions can further include associations between vocabularies and global terms, including child components of the global term, synonyms of the global term, and related global terms. In yet another aspect, as described infra, the definition of a global term can include parameters of use in the form of filters.

In an aspect, the definition of a global term can be pre-configured by vocabularies service 214. In another aspect, the definition of a global term can be provided in association with an annotation or annotation file. For example, the annotator, client or user can not only annotate data with global terms but also provide definitions of those global terms. However, in another aspect definition component 318 can apply definition information to a global term based on inferred or determined associations of the term with data and other terms as well as patterns of use of the term. In addition, analysis component 314 can infer requirements of consumption of annotated data that can also be included in a definition of a global term. Definition component 318 therefore applies inferences and/or determinations regarding definition information, (i.e. meaning of a term, associations of a term, consumption requirements for a term, applications of a term, and etc.) to create definitions of global terms in data store 304 or adds to existing definitions of global terms in data store 304.

Filter component 320, is configured to apply the aspects of definitions of global terms relating to requirements for consumption of annotated data in association with interface component 308 to render search queries against data store 304 that are tailored to a client. In particular, filter component is configured to filter query results based on consumption requirements. For example, in an aspect filter component 320 can determine appropriate layouts for presentation of data on different client devices or client software, and determine location specific applications of vocabularies. For example, depending on user device capabilities, certain display visualizations of data may not be supported although represented by an annotation. In another aspect, certain data models might be inappropriate in for use in certain contexts or environments. According to this aspect, analysis component 314 and/or inference component 316 can use tracked data indicating location and/or context of consumption of a data model to determine restrictions for applications of data models and or global terms and associate those restrictions with the definitions of respective global terms. Interface component 308 can further employ the conclusions regarding restrictions for consumption when issuing query results to client inference component 210.

Figure 4:
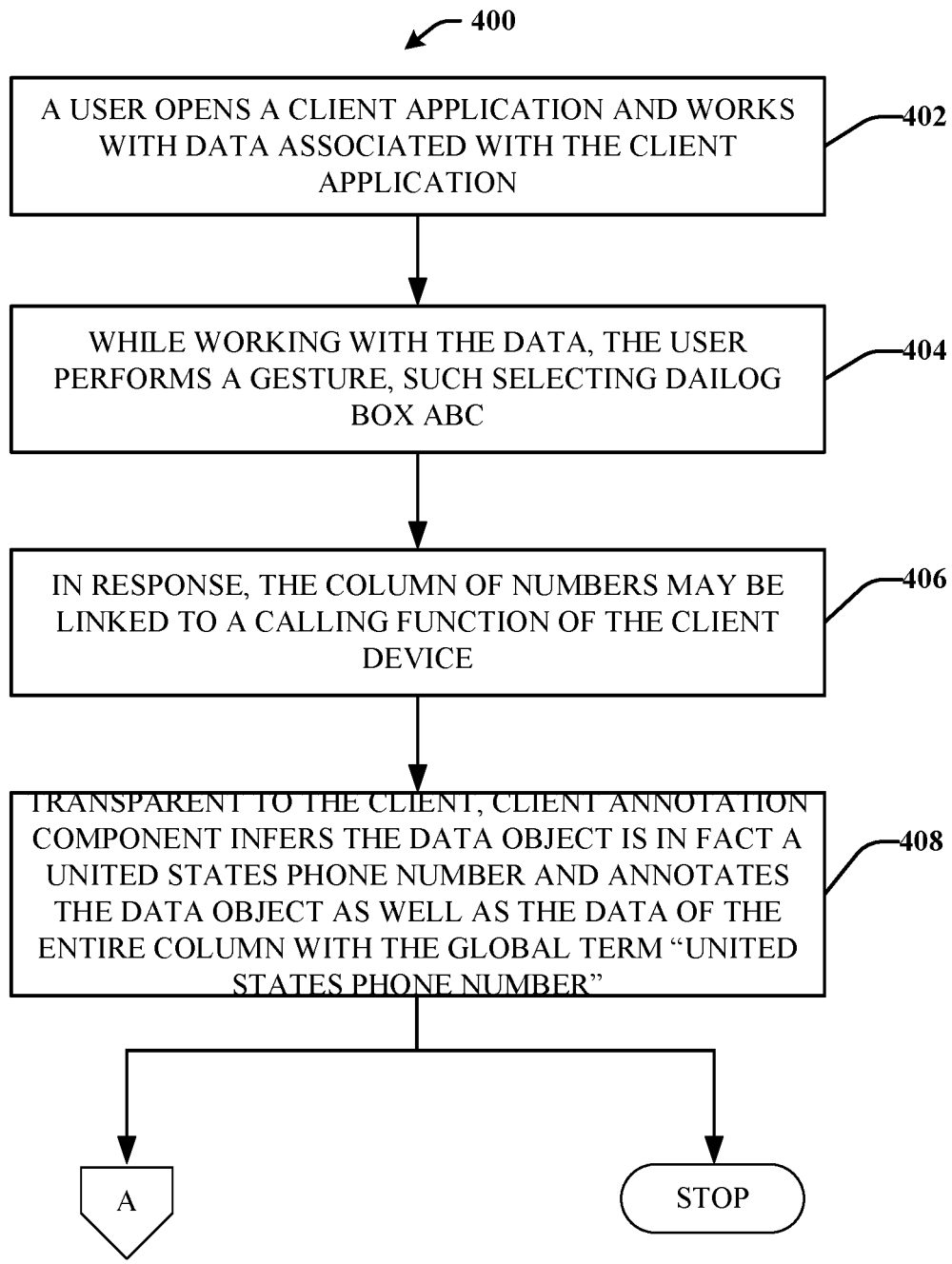
FIG. 4 illustrates a flow diagram of an example implementation of client annotation component in accordance with an embodiment.

Looking now at FIG. 4, illustrated is a flow diagram 400 exemplifying an application of client annotation component 102 or 202. According to the example application of client annotation component 102 or 202 in FIG. 4, at 402, a user can open a client application and work with data associated with the client application. For example, a user can open Excel™, Visual Studio™, or Montego™. The user can create a new document, employ data sources accessible via a network, or a combination of both. At 404, while working with or consuming data, the user can take some action to mark the data of a particular Excel™ column as a United States phone number. For example, the user may click on a column and mark and select a dialog box "ABC" that indicates the column is a United States phone number. In response, the column of numbers may be linked to a calling function of the client device. Transparent to the client, at 408, the client annotation component can infer the data objects in the column are in fact United States phone numbers and annotate the data of the entire column with the global term "United States phone number." For example, via client analysis and inference components, the client annotation component employ pre-configured associations between the gesture "clicking on dialog box "ABC" and the global term "United States phone number," defined in a client data store. In addition, the client annotation component can analyze context information which can include metadata associated with the data object and the data in the column as well as the client response to the gesture to validate that the global term "United States phone number" is appropriate for the selected data object. In addition, the client annotation component can infer that the global term "United States phone number" should also be applied to the data of the entire column. At this point the user can finish working with the data and close the client application. The annotation on the data can be stored in memory associated with the client or the client annotation component. In another aspect, the user can publish the data and associated annotation file.

Figure 5:
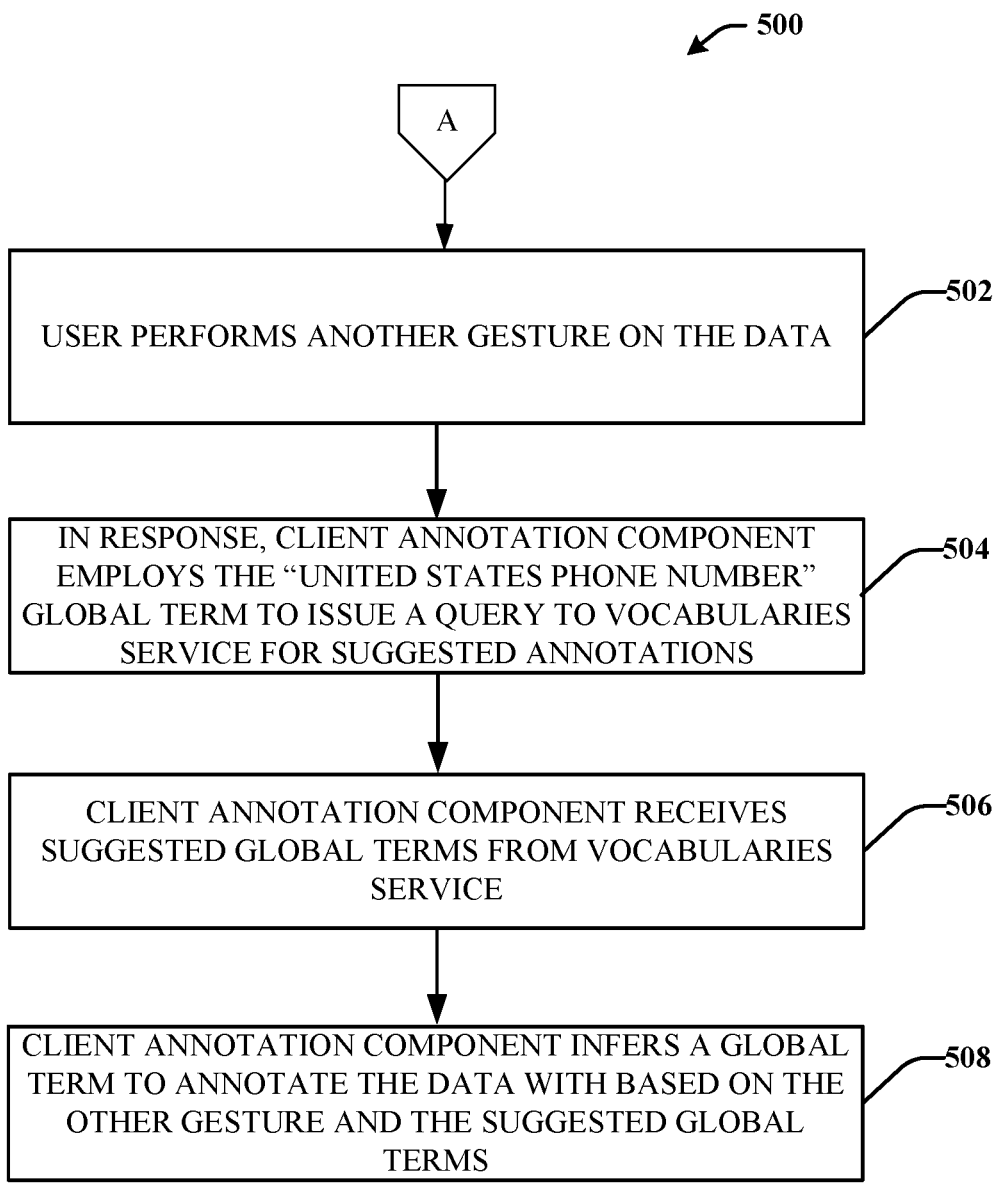
FIG. 5 illustrates a flow diagram of another example implementation of client annotation component employing a vocabularies service in accordance with an embodiment.

Continuing to FIG. 5, illustrated is a flow diagram 400 exemplifying another application of client annotation component 102 or 202 employing vocabularies service 214. In particular, presented is an example scenario where the user of flow diagram 400 continues working with the data from point A of process 400 in FIG. 4. At reference numeral 502, the user perform another gesture on the data. In response, at 504, the client annotation component can employ the "United States phone number" global term, which already exists as an annotation on the data, to issue a query to a vocabularies service 214 for suggested annotation. For instance, the client inference component can issue a query to the vocabularies service 214 and request global terms that are related to the global term "United States phone number." In another instance, the client inference component can issue a query to the vocabularies service 214 to receive suggested annotations by profiling annotations of other data sources employing the global term "United States phone number." At 506, the client annotation component can receive suggested global terms from the vocabularies service. Then at 508, the client annotation component can infer a global term to annotate the data with based on the other gesture and the suggest global terms. For example, the client annotation component can employ pre-configured associations between the other gesture and multiple global terms to determine a subset of global terms. The client annotation component can further accurately select a global term from the multiple global terms based on the suggested global terms.

Figure 6:
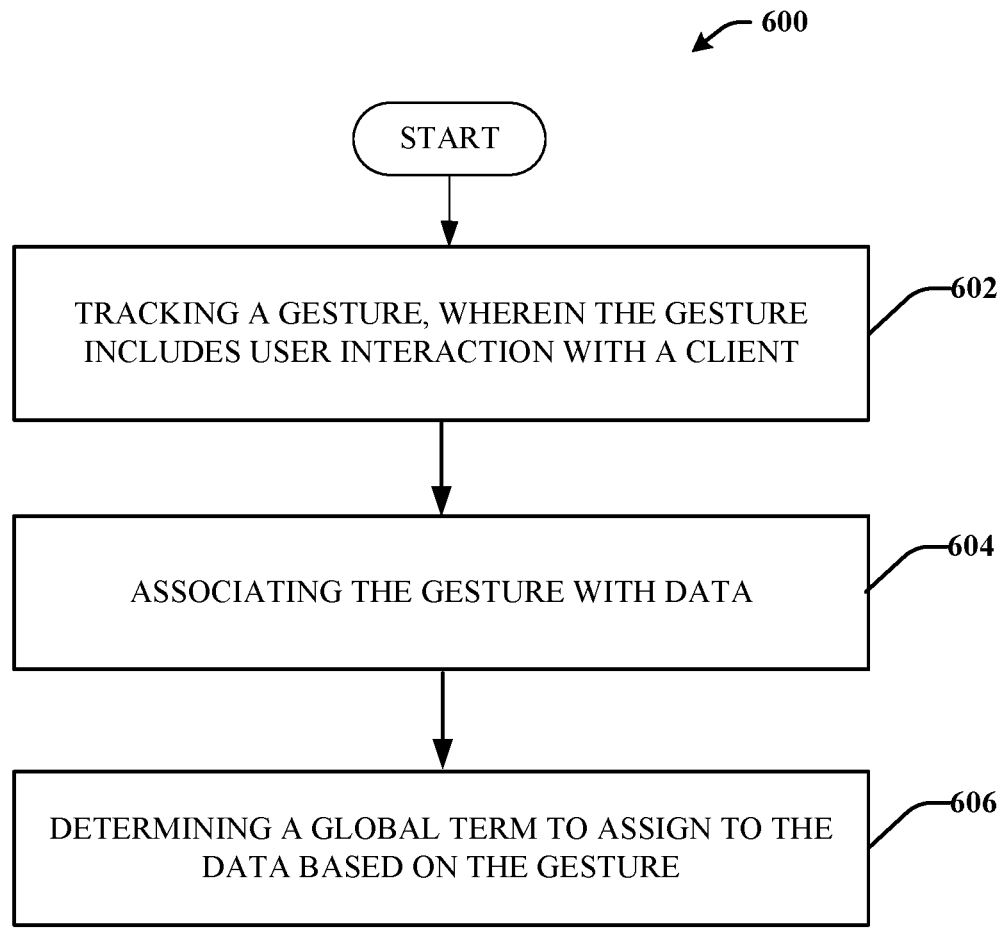
FIG. 6 illustrates a process a process for annotating data based on gestures.
Figure 7:
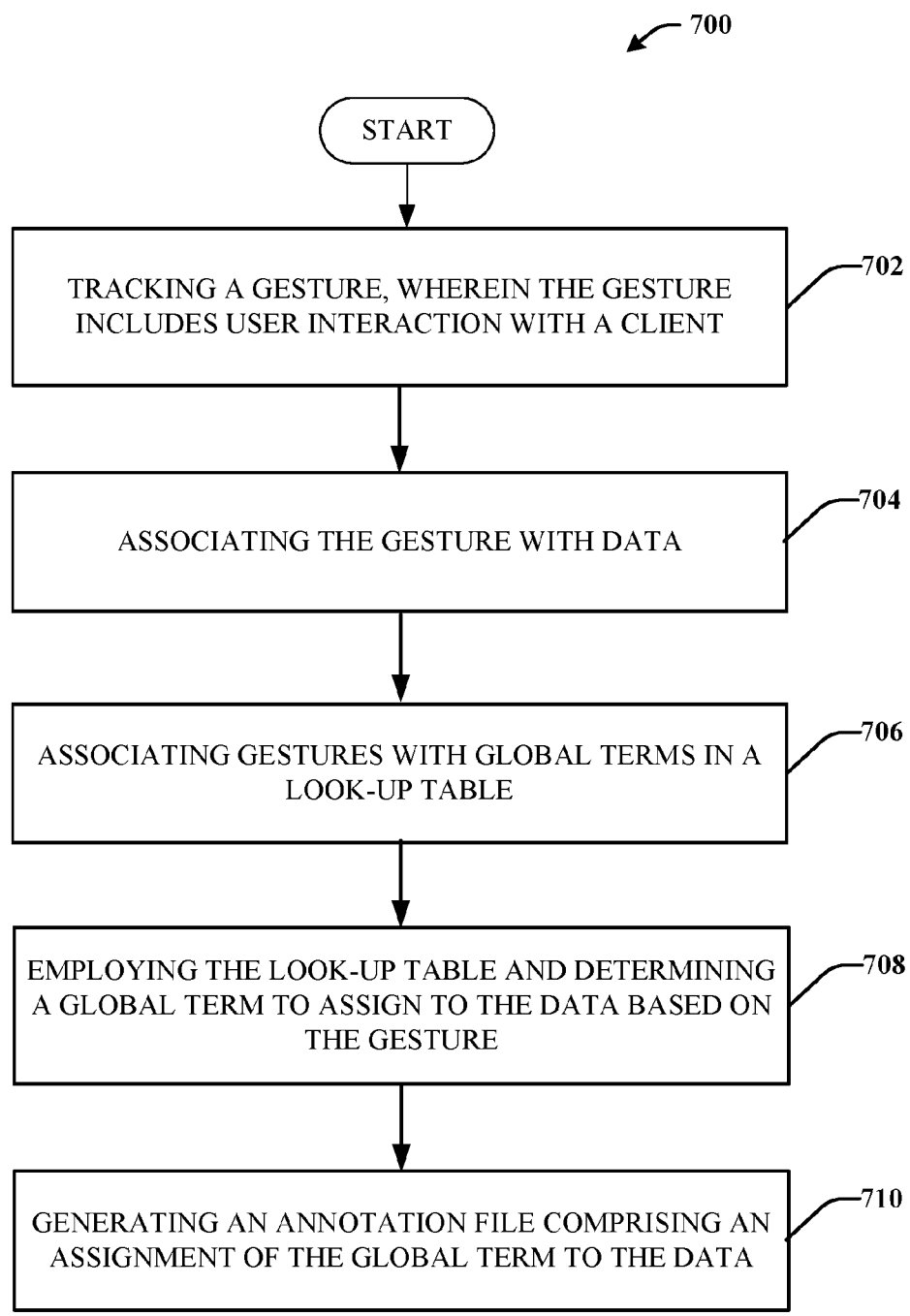
FIG. 7 illustrates a process for annotating data based on gestures by employing a look-up table.
Figure 8:
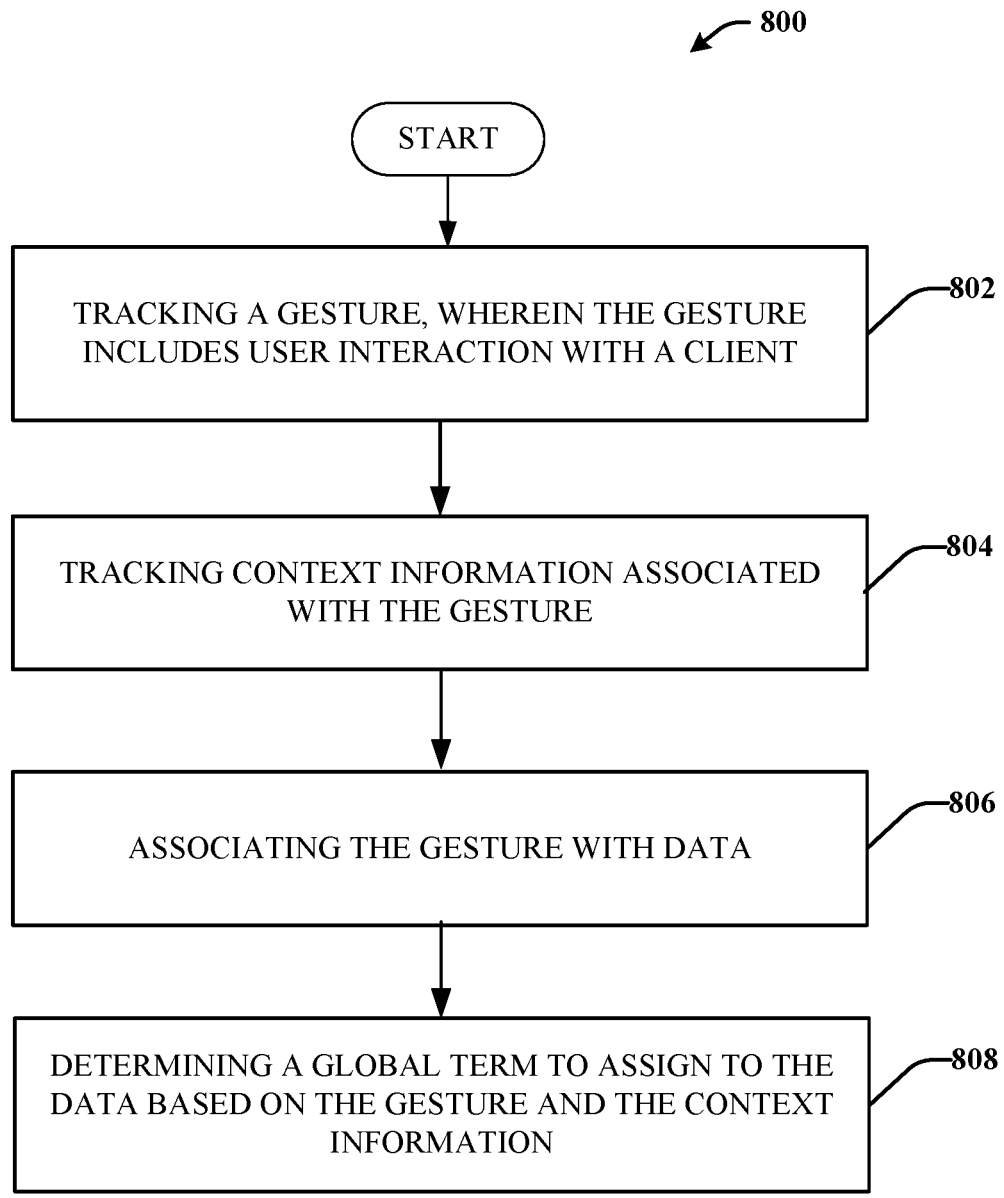
FIG. 8 illustrates a process for annotating data based on gestures and context information associated with the gestures.

FIGS. 6-8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers.

Referring now to FIG. 6, exemplary method 600 for annotating data based on gestures is depicted. Generally, at reference numeral 602, a gesture is tracked, wherein the gesture includes user interaction with a client. For example, a client can include a client device or software executable on the client device. An example gesture can include a command, a request, or an action associated with data. For example, a gesture can include clicking on a data object to select the data object. At 604, the gesture is associated with data. In an aspect, a user may perform several gestures that can be associated with the same data. Then at 606, a global term to assign to the data is determined based on the gesture. According to method 600, the data can become annotated transparently to the user.

Turning now to FIG. 7 exemplary method 700 for annotating data based on gestures is depicted. Generally, at reference numeral 702, a gesture is tracked, wherein the gesture includes user interaction with a client. For example, a client can include a client device or software executable on the client device. An example gesture can include a command, a request, or an action associated with data. For example, a gesture can include clicking on a data object to select the data object. At 704, the gesture is associated with data. In an aspect, a user may perform several gestures that can be associated with the same data. AT 706, gestures are associated with global terms in a look-up table. According to this aspect, one or more global terms can be assigned to a gesture at the time prior to execution of the a client device or client software. In other words, the client can be store pre-configured associations between gestures and global terms. At 708, the look-up table is employed to facilitate determining a global term to assign to the data based on the gesture. Then at 710, an annotation file comprising an assignment of the global term to the data is generated. The annotation file can be associated with the data and stored in memory associated with the client or pushed to an external data store. According to method 700, data can become annotated transparently to the user.

Referring now to FIG. 8, presented is another exemplary method 800 for annotating data based on gestures. Generally, at reference numeral 802, a gesture is tracked, wherein the gesture includes user interaction with a client. For example, a client can include a client device or software executable on the client device. An example gesture can include a command, a request, or an action associated with data. For example, a gesture can include clicking on a data object to select the data object. At 804, context information associated with the gesture is tracked. Context information can include any conditions and facts surrounding the gesture. For example, context information can include metadata associated with the data, including annotations on the data. Context information can further include client responses to gestures and physical parameters associated with the client at the time of the gesture. At 806, the gesture is a associated with data. In an aspect, a user may perform several gestures that can be associated with the same data. Then at 806, a global term to assign to the data is determined based on the gesture and the context information. According to method 800, data can become annotated transparently to the user.

Exemplary Networked and Distributed Environments

One of ordinary skill in the art can appreciate that the various embodiments of dynamic composition described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the smooth streaming mechanisms as described for various embodiments of the subject disclosure.

Figure 9:
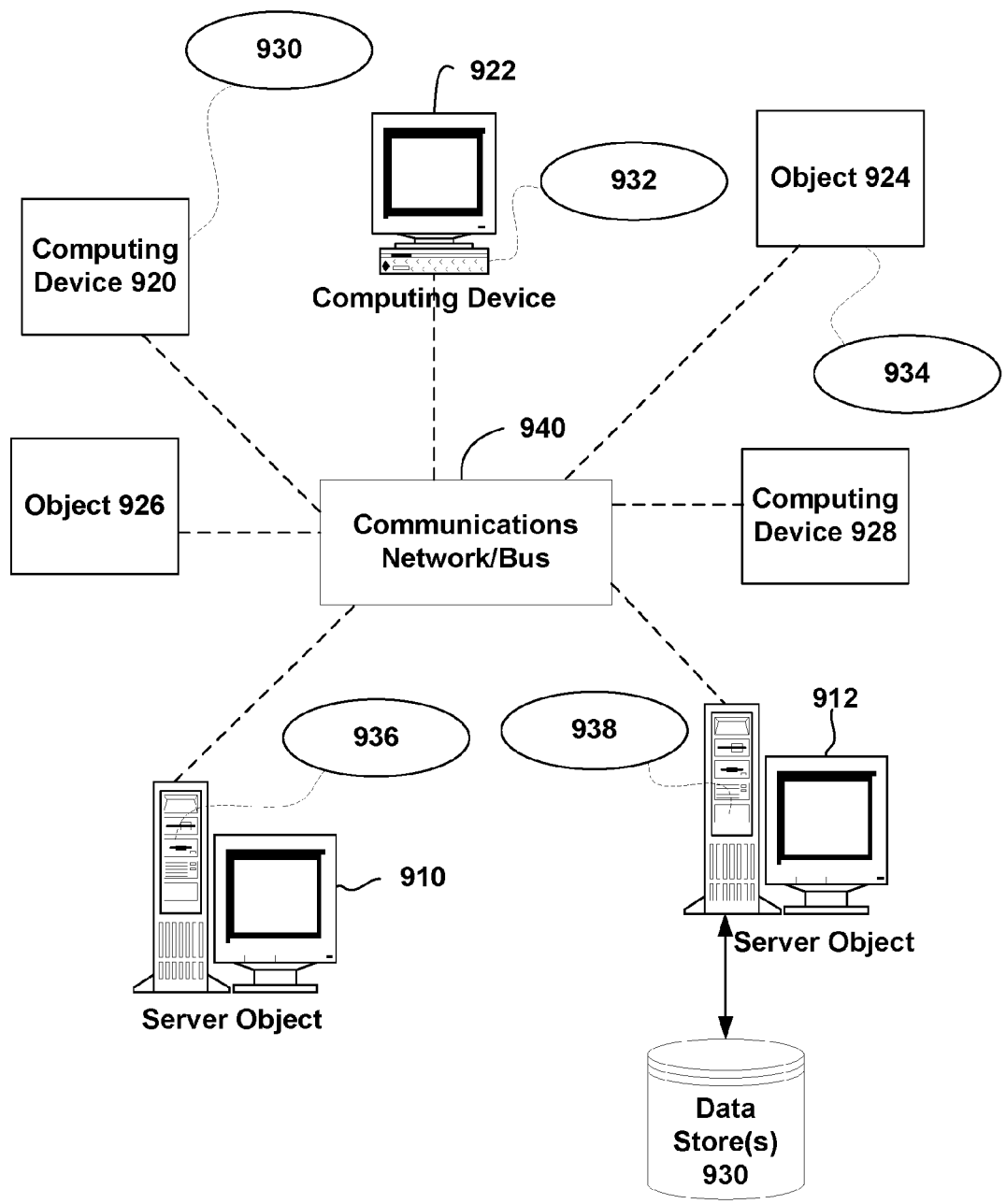
FIG. 9 is a block diagram representing an exemplary non-limiting networked environment in which the various embodiments may be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 910, 912, etc. and computing objects or devices 920, 922, 924, 926, 928, etc. may comprise different devices, such as PDAs, audio/video devices, mobile phones, MP3 players, personal computers, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object 910, 912, etc. or computing objects or devices 920, 922, 924, 926, 928, etc. can also contain an application, such as applications 930, 932, 934, 936, 938, that might make use of an API, or other object, software, firmware and/or hardware, suitable for communication with or implementation of the smooth streaming provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the dynamic composition systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances. Any of these computing devices may be processing data, or requesting transaction services or tasks that may implicate the techniques for dynamic composition systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing read set validation or phantom checking can be provided standalone, or distributed across multiple computing devices or objects.

In a network environment in which the communications network/bus 940 is the Internet, for example, the computing objects 910, 912, etc. can be Web servers with which the client computing objects or devices 920, 922, 924, 926, 928, etc. communicate via any of a number of known protocols, such as the hypertext transfer protocol (HTTP). Server objects 910, 912, etc. may also serve as client computing objects or devices 920, 922, 924, 926, 928, etc., as may be characteristic of a distributed computing environment.

Exemplary Computing Device

Figure 10:
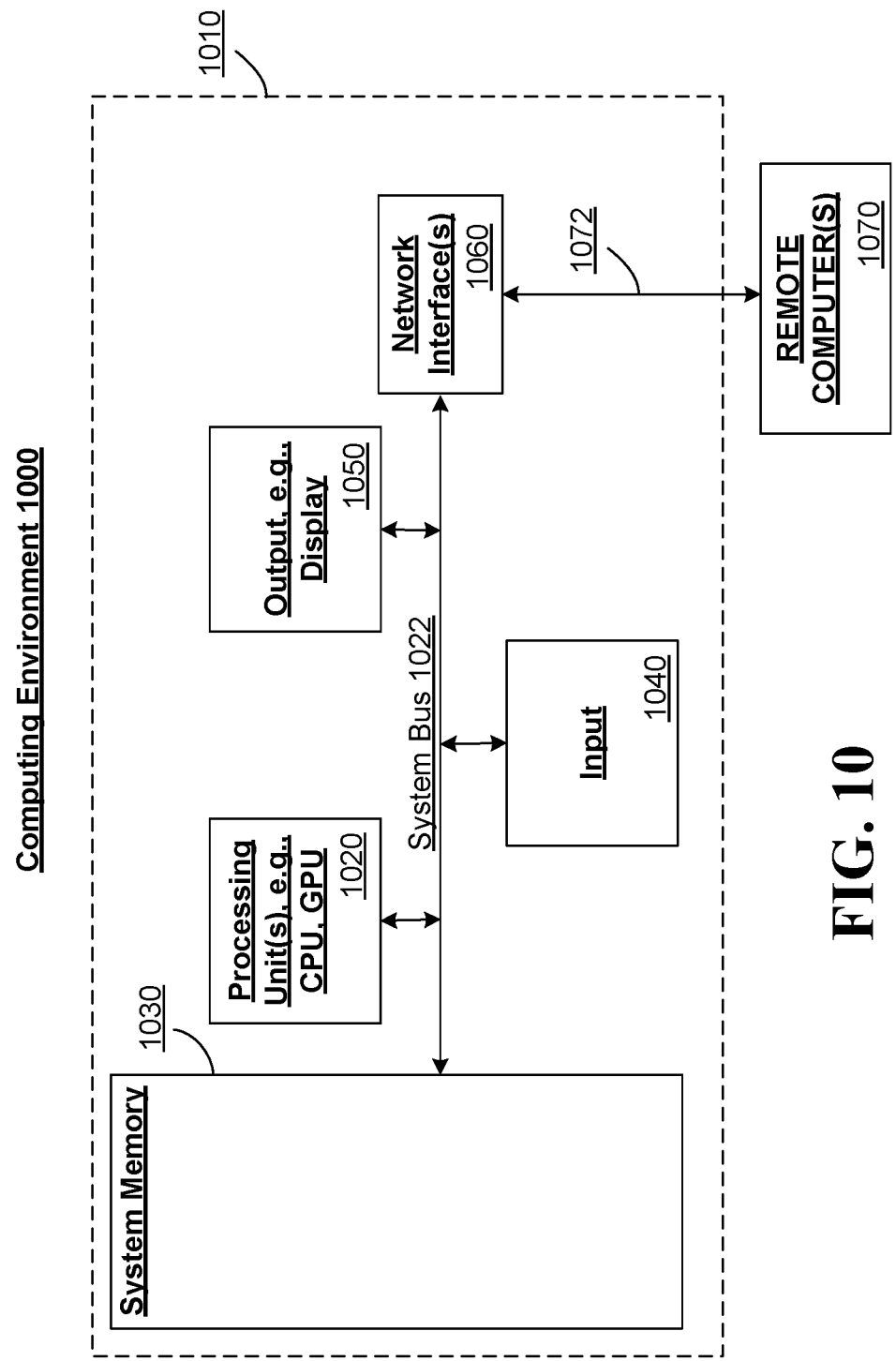
FIG. 10 is a block diagram representing an exemplary non-limiting computing system or operating environment in which the various embodiments may be implemented.

As mentioned, advantageously, the techniques described herein can be applied to any device where it is desirable to perform dynamic composition. It is to be understood, therefore, that handheld, portable and other computing devices and computing objects of all kinds are contemplated for use in connection with the various embodiments, i.e., anywhere that a device may wish to read or write transactions from or to a data store. Accordingly, the below general purpose remote computer described below in FIG. 10 is but one example of a computing device. Additionally, a database server can include one or more aspects of the below general purpose computer, such as a media server or consuming device for the dynamic composition techniques, or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither is the computing environment 1000 be interpreted as having any dependency or requirement relating to any one or combination of components illustrated in the exemplary operating environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the dynamic composition techniques. Thus, embodiments herein are contemplated from the standpoint of an API (or other software object), as well as from a software or hardware object that implements one or more aspects of the smooth streaming described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in zone or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A computing device, comprising:
a memory and a processor that are respectively configured to store and execute instructions, including instructions for causing the computing device to:
track a gesture, wherein the gesture represents a user interaction with the computing device;
associate the gesture with a data item;
identify the gesture from amongst gestures of a set of gestures; and
determine, from a lookup-up table, a global term to assign to the data item based on the gesture and a corresponding data-type, wherein the look-up table associates gestures with global terms based on a data-type corresponding to each gesture.

2. The computing device of claim 1, wherein the instructions are also for causing the computing device to:
determine a structure of the data item based on the global term.

3. The computing device of claim 1, wherein the instructions are also for causing the computing device to:
determine a capability of the data item based on the global term.

4. The computing device of claim 1, wherein the instructions are also for causing the computing device to:
generate an annotation file comprising an assignment of the global term to the data item.

5. The computing device of claim 1, wherein the instructions are also for causing the computing device to:
associate gestures with global terms in the look-up table; and
employ the look-up table in the assigning of the global term to the data item.

6. The computing device of claim 5, wherein the instructions are also for causing the computing device to:
associate gestures with global terms in the look-up table based on a client identity.

7. The computing device of claim 1, the gesture comprising at least one action or command selected from a group consisting of changing a format associated with the data item, playing the data item, moving a pointer over the data item, and performing a call or text message based on the data item.

8. The computing device of claim 1, wherein:
the data item includes a telephone number; and
the instructions are also for causing the computing device to:
track a response to a telephone call based on the telephone number; and
determine a global term to assign to the data item based on a response to the telephone call.

9. The computing device of claim 1, wherein:
the instructions are also for causing the computing device to:
identify a first global term to assign to the data item based on the gesture and a second global term to assign to the data item based on a gesture series, and
the gesture series includes the gesture and at least one other gesture.

10. The computing device of claim 1, wherein the gesture represents a request to initiate communication with another computing device.

11. The computing device of claim 1, wherein:
the instructions are also for causing the computing device to:
track descriptive metadata associated with the gesture or a gesture series; and
determine the global term to assign to the data item based on the descriptive metadata; and
the descriptive metadata comprising at least one of a date of creation of the data item, a creator or author of the data item, a placement of the data item on a computer network, or standards used to create the data item.

12. The computing device of claim 1, wherein the instructions are also for causing the computing device to:
employ a search engine external from the computing device to find suggested global terms based on the global term; and
employ the suggested global terms in the assigning of the global term to the data item.

13. The computing device of claim 1, wherein the instructions are also for causing the computing device to:
track context information associated with the gesture, wherein the determining the global term to assign to the data item further comprises determining the global term to assign to the data item based on the context information.

14. A method, comprising:
tracking a gesture, wherein the gesture represents a user interaction with a computing device;
identifying the gesture from amongst a plurality of gestures;
determining, based at least in part on the gesture, a global term to assign to a data item associated with the gesture; and
assigning the global term to the data item associated with the gesture.

15. The method of claim 14, wherein the determining of the global term is based on use of a look-up table that correlates global terms to data types.

16. The method of claim 14, further comprising:
employing a search engine external from the computing device to find suggested global terms; and
employing the suggested global terms in the assigning of the global term to the data item.

17. The method of claim 14, further comprising determining a structure of the data item based on the global term.

18. A computing device, comprising:
a memory and a processor that are respectively configured to store and execute instructions, including instructions for causing the computing device to perform operations, the operations comprising:
tracking a gesture, wherein the gesture represents a user interaction with the computing device;
identifying the gesture from amongst a plurality of gestures;
determining, based at least in part on the gesture, a global term to assign to a data item associated with the gesture; and
assigning the global term to the data item associated with the gesture.

19. The computing device of claim 18, wherein the operations further comprise:
tracking descriptive metadata associated with the gesture, the descriptive metadata comprising at least one a date of creation of the data item, a creator or author of the data item, a placement of the data on a computer item network, or standards used to create the data item.

20. The computing device of claim 18, wherein the determining the global term to assign to the data item is based on one or more constraints imparted by the client.

* * * * *